(12) United States Patent
Chavez et al.

(10) Patent No.: US 7,841,422 B1
(45) Date of Patent: Nov. 30, 2010

(54) SOIL SEPARATING SYSTEMS

(76) Inventors: Joseph J. Chavez, 3120 W. Carefree Hwy., Suite I-127, Phoenix, AZ (US) 85086; Cecil C. Farnsworth, 17522 W. Bacabi Rd., Marana, AZ (US) 85653

(*) Notice: Subject to any disclaimer, the term of this patent is extended or adjusted under 35 U.S.C. 154(b) by 743 days.

(21) Appl. No.: 11/104,970

(22) Filed: Apr. 12, 2005

Related U.S. Application Data

(60) Provisional application No. 60/561,711, filed on Apr. 12, 2004, provisional application No. 60/638,724, filed on Dec. 23, 2004.

(51) Int. Cl.
*A01B 43/00* (2006.01)

(52) U.S. Cl. .................. 171/63; 171/18; 171/111

(58) Field of Classification Search .......... 171/63, 171/14, 15, 18, 111
See application file for complete search history.

(56) References Cited

U.S. PATENT DOCUMENTS

| | | | | |
|---|---|---|---|---|
| 3,010,523 | A * | 11/1961 | Gifford | 171/63 |
| 4,221,265 | A * | 9/1980 | Pratt | 171/126 |
| 4,241,792 | A | 12/1980 | Kratzer | |
| 4,313,502 | A * | 2/1982 | Nelson | 171/63 |
| 4,482,019 | A | 11/1984 | Murphy | |
| 4,837,950 | A * | 6/1989 | Vesper | 37/305 |
| 2003/0014885 | A1 * | 1/2003 | Foutz et al. | 37/142.5 |

* cited by examiner

*Primary Examiner*—Thomas B Will
*Assistant Examiner*—Jamie L McGowan
(74) *Attorney, Agent, or Firm*—Stoneman Volk Patent Group; Martin L. Stoneman; Michael D. Volk, Jr.

(57) ABSTRACT

A towable apparatus adapted for the separation of rock, stones, or debris from topsoil, having a stationary, non-vibrating sifting screen. A hydraulically powered conveyor belt with paddles pushes the soil across the sifting screen. The system provides features to assist prevention of machine jamming by large debris. A method of use is also disclosed.

32 Claims, 14 Drawing Sheets

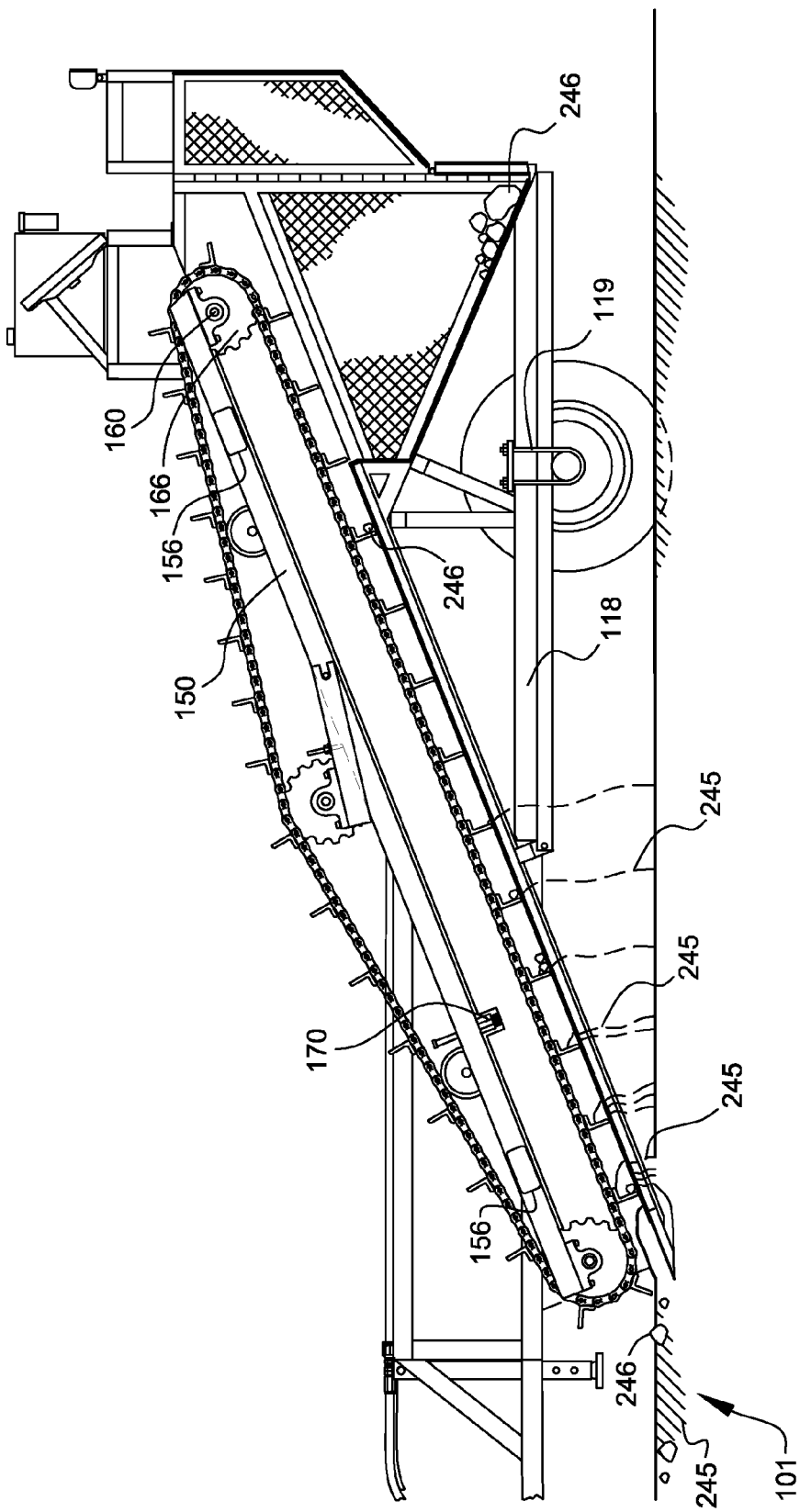

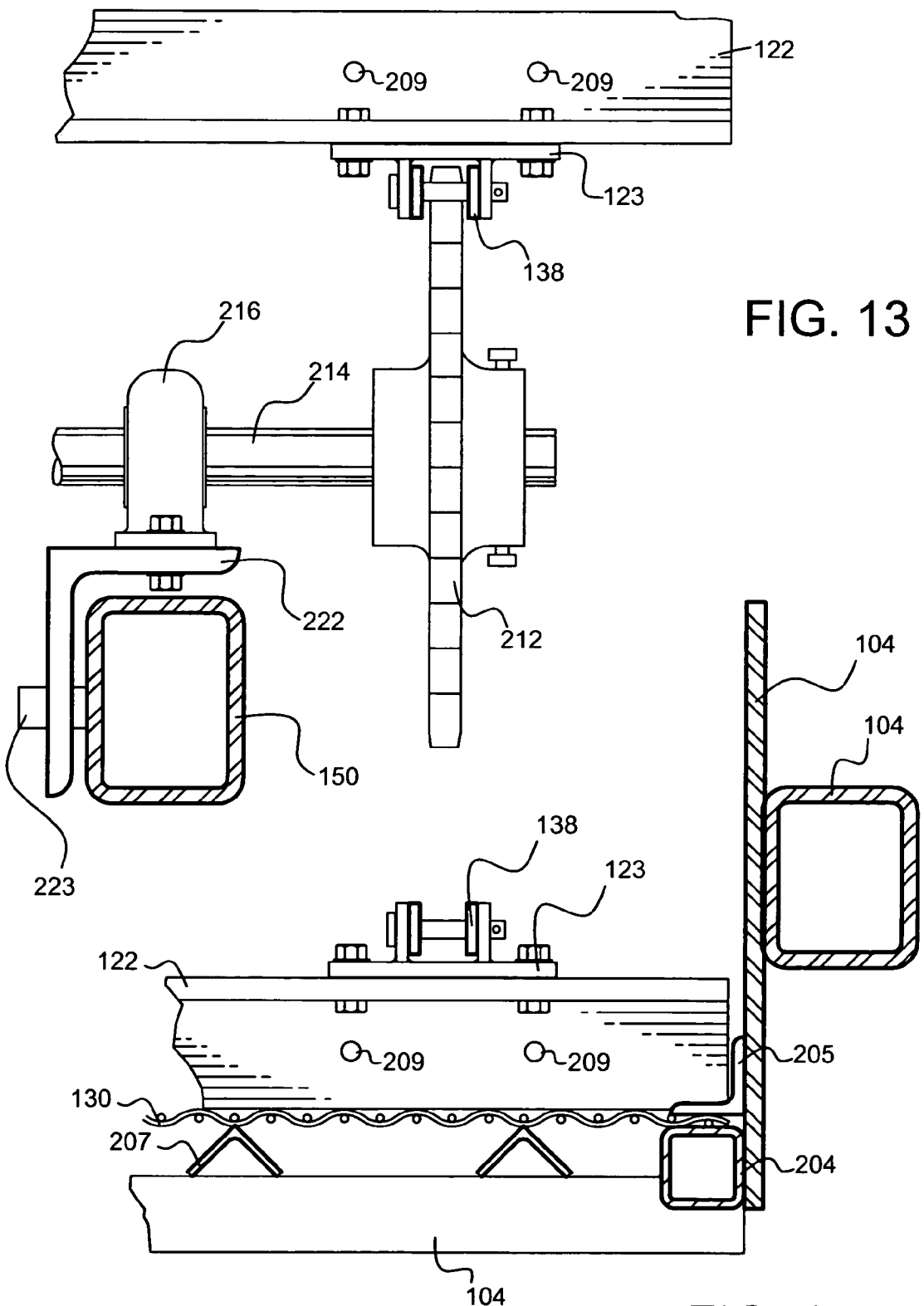

SOIL SEPARATING SYSTEMS

CROSS-REFERENCE TO RELATED APPLICATION

The present application is related to and claims priority from prior provisional application Ser. No. 60/561,711, filed Apr. 12, 2004, entitled "RID O ROC", and is related to and claims priority from prior provisional application Ser. No. 60/638,724, filed Dec. 23, 2004, entitled "SOIL SEPARATING SYSTEMS", the contents of both of which are incorporated herein by this reference and are not admitted to be prior art with respect to the present invention by the mention in this cross-reference section.

BACKGROUND

This invention relates to soil separating systems. More specifically, this invention relates to providing a mobile system for improved soil separating of rock, stones and debris from topsoil.

Typically, separating debris and rock from soil is a very costly and time-consuming task requiring several pieces of machinery and a great deal of manpower. For example, horse racetracks have an ongoing issue of maintaining rock free material to protect the horse and rider. Flying rocks during competition have blinded many riders and horses. Furthermore, topsoil separation is utilized at construction projects, school fields for football, baseball or soccer, horse arenas, rodeo arenas, etc.

Maintenance of horse racetracks currently involves periodic track refurbishment requiring all the material along the racetrack be cut to a depth of about 16 inches and removed. This material is typically then delivered to a stockpile where it is screened by a stationary power-shaker. Using a payloader or perhaps laborers with shovels, the stockpiled material is loaded onto a vibrating screen until the debris is separated from the soil. This process provides vibration to shake the correct sized soil through the holes in the screen and leave the larger debris and rock on top to be removed by hand or dumped by machine. The cleaned soil that falls through the screen is then reloaded onto trucks and hauled to the selected location to be spread by a loader or bulldozer. Currently, such soil screening requires material to be dry and generally screened to ⅜-inch minus (or less) material. The above-described tasks currently require using multiple pieces of equipment and considerable manpower that are both time-consuming and expensive. The current method usually takes about one month or longer, during which time the track is generally unusable.

OBJECTS AND FEATURES OF THE INVENTION

A primary object and feature of the present invention is to provide a system to solve the above-mentioned problems and meet the above-mentioned needs. Another primary object and feature of the present invention is to provide an improved system for separating selected sizes of rock, stones and debris from topsoil.

It is a further object and feature of the present invention to provide such a system that may be adjusted for at least one selected sized material and at least one unselected sized material. It is a further object and feature of the present invention to provide such a system comprising at least one stationary, non-vibrating screen. It is a further object and feature of the present invention to provide such a system that may be towed by a towing vehicle. It is a further object and feature of the present invention to provide such a system that may be powered by a towing vehicle. It is a further object and feature of the present invention to provide such a system that may be depth adjusted from about 1 inch to about 16 inches. It is a further object and feature of the present invention to provide such a system that provides reduced jamming features to assist prevention of machine-jamming caused by large boulders or debris.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a soil separating system relating to separating unprocessed soil into selected soil and unselected soil, comprising: separator means for separating the selected soil from the unselected soil on the basis of at least one selected particle-size; unprocessed soil collector means for collecting the unprocessed soil onto such separator means; housing vehicle means for housing such separator means on at least one vehicle; wherein such separator means is fixed relative to such housing vehicle means; and soil pusher means for pushing the unprocessed soil over such separator means; wherein such separator means comprises aperture means for permitting the at least one selected particle-sizes of soil to pass through such separator means.

In accordance with another preferred embodiment hereof, this invention provides a soil separating system relating to separating unprocessed soil into selected soil and unselected soil, comprising: at least one separator adapted to separate the selected soil from the unselected soil on the basis of at least one selected particle-size; at least one unprocessed soil collector adapted to collect the unprocessed soil onto such at least one separator; at least one housing vehicle adapted to house such at least one separator on at least one vehicle; wherein such at least one separator is fixed relative to such at least one housing vehicle; and at least one soil pusher adapted to push the unprocessed soil over such at least one separator; wherein such at least one separator comprises at least one aperture adapted to permit the at least one selected particle-sizes of soil to pass through such at least one separator.

Moreover, it provides such a soil separating system, further comprising at least one holder adapted to hold at least one unselected particle-sizes of soil. Additionally, it provides such a soil separating system, wherein the unselected soil is pushed across such at least one separator and into such at least one holder.

Moreover, it provides such a soil separating system, wherein such at least one housing vehicle further comprises such at least one holder. Additionally, it provides such a soil separating system, wherein such at least one holder comprises at least one bin. Also, it provides such a soil separating system, wherein such at least one bin comprises at least one unselected soil dump release. In addition, it provides such a soil separating system, wherein such at least one bin has a capacity of about 4 cubic yards of unselected soil.

And, it provides such a soil separating system, wherein such at least one separator comprises at least one screen adapted to screen sift the unselected soil from the selected soil. Further, it provides such a soil separating system, wherein such at least one screen is removable. Even further, it provides such a soil separating system, wherein such at least one screen comprises at least one set of interchangeable screens, each respective one of such interchangeable screens adapted to sift at least one size of unselected soil from the selected soil. Moreover, it provides such a soil separating system, wherein such at least one screen is substantially flat. Additionally, it provides such a soil separating system, wherein such at least one screen is substantially rigid. Also, it provides such a soil separating system, wherein such at least one screen comprises at least one woven metal sheet comprising at least one open area to permit passage of the selected soil.

In addition, it provides such a soil separating system, wherein such at least one soil pusher comprises at least one powered pusher adapted to provide powered pushing movement of the unprocessed soil over such at least one separator. And, it provides such a soil separating system, wherein such at least one powered pusher comprises at least one conveyor belt. Further, it provides such a soil separating system, wherein such at least one conveyor belt comprises at least one chain.

Even further, it provides such a soil separating system, further comprising: at least one automatic adjuster adapted to automatically adjust the distance between such at least one powered pusher and such at least one separator; wherein such at least one automatic adjuster comprises at least one jamming reducer adapted to reduce jamming between such at least one powered pusher and such at least one separator during sifting of the unprocessed soil. Moreover, it provides such a soil separating system, wherein such at least one automatic adjuster comprises at least one hinge adapted to adjust the angle between such at least one powered pusher and such at least one separator. Additionally, it provides such a soil separating system, wherein such at least one powered pusher comprises at least one hydraulic power system adapted to hydraulically power such at least one powered pusher.

Also, it provides such a soil separating system, wherein such at least one hydraulic power system comprises at least one hydraulic pump adapted to be powered by at least one power-take-off drive. In addition, it provides such a soil separating system, wherein such at least one hydraulic power system comprises at least one hydraulic motor. And, it provides such a soil separating system, further comprising at least one depth selector adapted to select the depth of the unprocessed soil that is collected by such at least one unprocessed soil collector. Further, it provides such a soil separating system, wherein such at least one depth selector comprises a plurality of soil depth selections between about 1 inch and at least about 16 inches.

Even further, it provides such a soil separating system, wherein such at least one housing vehicle is adapted to be towed by at least one towing vehicle during sifting. Moreover, it provides such a soil separating system, further comprising at least one towing vehicle. Additionally, it provides such a soil separating system, wherein such at least one depth selector comprises at least one height-adjustable hitch on such at least one towing vehicle. Also, it provides such a soil separating system, wherein such at least one height-adjustable hitch comprises at least one hydraulic hitch. In addition, it provides such a soil separating system, wherein such at least one towing vehicle comprises at least one tractor.

And, it provides such a soil separating system, wherein such at least one housing vehicle is adapted to be towed by at least one towing vehicle on public streets. Further, it provides such a soil separating system, further comprising at least one towing vehicle having a towing capacity of at least about 5000 pounds.

In accordance with another preferred embodiment hereof, this invention provides a soil separating system, comprising: at least one housing vehicle adapted to house; at least one fixed screen adapted to screen unprocessed soil into selected soil and unselected soil on the basis of particle-size; wherein such at least one fixed screen is fixed relative to such at least one housing vehicle; at least one holder adapted to hold the unselected soil; at least one powered pusher adapted to push unprocessed soil over such at least one fixed screen; wherein such at least one powered pusher is hingedly connected to such at least one housing vehicle adjacent such at least one holder; wherein such at least one powered pusher comprises at least one hydraulic power system; wherein such at least one hydraulic power system comprises at least one conveyor belt, wherein such at least one conveyor belt comprises at least one paddle adapted to push unprocessed soil across such at least one fixed screen; whereby the selected soil falls through such at least one fixed screen; and whereby the unselected soil is pushed across such at least one fixed screen and into such at least one holder; at least one towing vehicle adapted to tow such at least one housing vehicle across the unprocessed soil; at least one unprocessed soil collector adapted to collect the unprocessed soil onto such at least one fixed screen when such at least one housing vehicle is being towed across the unprocessed soil; and at least one depth selector adapted to select the depth of the unprocessed soil that is collected by such at least one unprocessed soil collector.

In accordance with another preferred embodiment hereof, this invention provides a soil separating system, relating to conditioning unprocessed soil in sports venues, comprising the steps of: selecting at least one depth of unprocessed soil to collect; selecting at least one particle size; installing at least one screen having openings of such at least one particle size in at least one soil separator; towing such at least one soil separator through such depth of unprocessed soil; collecting such depth of unprocessed soil onto such at least one screen; pushing such unprocessed soil across such at least one screen; allowing the soil particles smaller than such at least one particle size to fall through such at least one screen; pushing the soil particles larger than such at least one particle size across such at least one screen and into at least one holder; wherein unprocessed soil is continuously collected and screened as such at least one soil separator is towed through such unprocessed soil; whereby such unprocessed soil is cleared of soil particles larger than such at least one particle size.

In accordance with another preferred embodiment hereof, this invention provides each and every novel feature, element, combination, step and/or method disclosed or suggested by this provisional patent application.

BRIEF DESCRIPTION OF THE DRAWINGS

FIG. 3 shows a sectional view through section A-A of FIG. 2A.

FIG. 13 shows a sectional view trough the section B-B of FIG. 2A illustrating the drive gear of the soil separating system according to a preferred embodiment of the present invention.

FIG. 14 shows a sectional view trough the section B-B of FIG. 2A illustrating the screen assembly of the soil separating system according to a preferred embodiment of the present invention.

DETAILED DESCRIPTION OF THE BEST MODES AND PREFERRED EMBODIMENTS OF THE INVENTION

Figure 1:
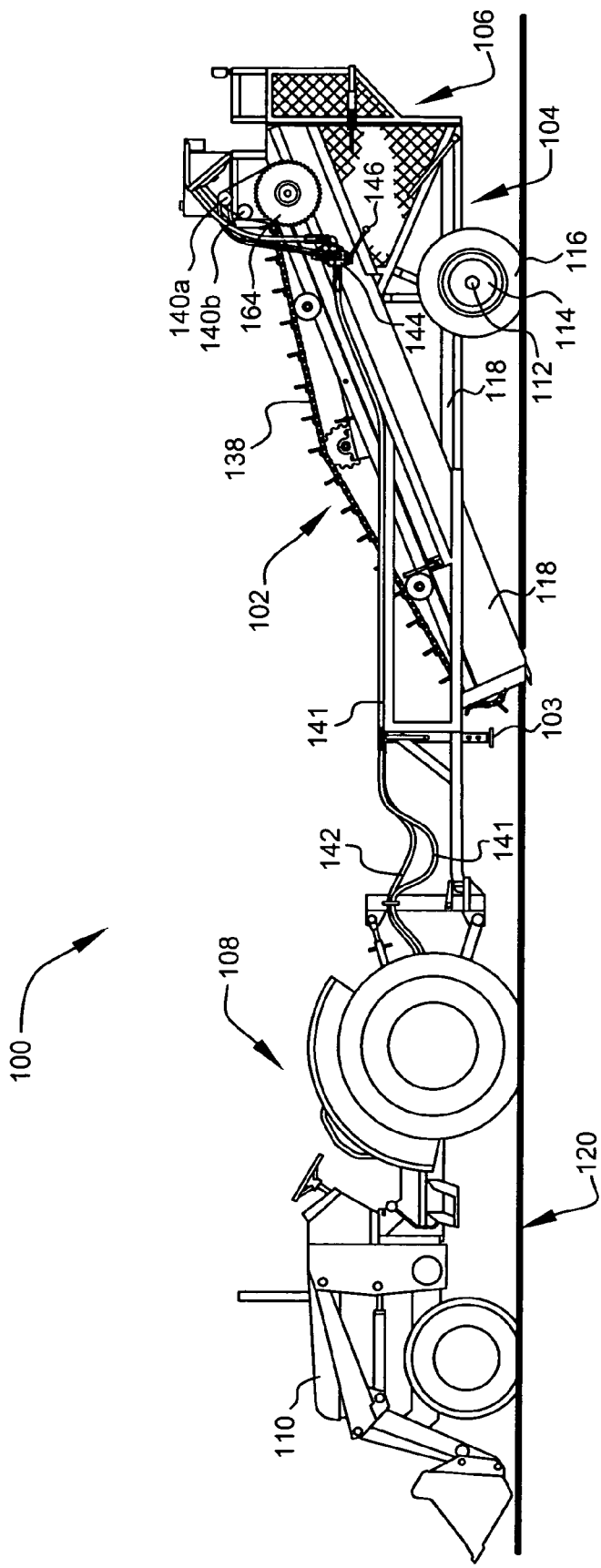
FIG. 1 shows a perspective view illustrating the soil separating system according to a preferred embodiment of the present invention.

FIG. 1 shows a perspective view illustrating a soil separating system 100 according to a preferred embodiment of the present invention. Preferably, soil separating system 100 comprises a soil separator 102, a mobile housing assembly 104, and a discard bin 106, as shown. Preferably, soil separating system 100 further comprises a towing vehicle 108, as shown.

Preferably, mobile housing assembly 104 houses soil separator 102 and discard bin 106, as shown. Preferably, mobile housing assembly 104 is attachable to towing vehicles 108, as shown, most preferably both to a tractor 110 during operation and at least about a one-ton pick-up truck for over-the-road transport. Preferably, the combined weight of the mobile housing assembly 104, soil separator 102, and discard bin 106 is about 5000 pounds or less. Upon reading the teachings of this specification, those with ordinary skill in the art will now understand that, under appropriate circumstances, considering such issues as advances in technology, user preference, housing weight, etc., other towing vehicles, such as sport utility vehicles, industrial trucks, agricultural equipment, etc., may suffice.

Preferably, mobile housing assembly 104 comprises at least one wheel axle 112, preferably about a 4-inch diameter axle, preferably comprising at least one wheel drum 114 and at least one wheel 116 on each end of the wheel axle 112, as shown. Preferably, mobile housing assembly 104 comprises mobile housing frame 118, as shown. Preferably, U-bolts 119 hold the wheel axle 112 onto mobile housing frame 118 (as shown in FIG. 3). Upon reading the teachings of this specification, those with ordinary skill in the art will now understand that, under appropriate circumstances, considering such issues as economic considerations, user preference, weight load, manufacturing preferences, etc., other mobile housing assemblies or housings, such as multiple wheel, multiple axle, heavier, lighter, other wheel connections, etc., may suffice.

Preferably, the mobile housing assembly 104 has an overall length of about 15 feet, a width of about 6 feet and a total height of about 8 feet as measured from the ground surface 120. Preferably, wheels 116 are located under mobile housing assembly 104, rather than out to the sides, so that soil separating system 100 is only as wide as mobile housing assembly 104, as shown. This arrangement provides a slimmer profile for easier access through "standard" gate openings such as those at racetracks, easier transportation along roadways, and easier storage in standard garage or storage facilities.

Preferably, wheel axle 112 and wheels 116 are adapted to be used at highway speeds when soil separating system 100 is towed by a suitable towing vehicle 108. Upon reading the teachings of this specification, those with ordinary skill in the art will now understand that, under appropriate circumstances, considering such issues as economic consideration, user preference, weight load, manufacturing preference, transportation regulations, intended use, etc., other mobile housing dimensions, such as longer, wider, shorter, taller, etc., may suffice.

Preferably, mobile housing assembly 104 comprises stand 103, which is preferably an adjustable-height trailer jack as shown. Stand 103 is preferably used to adjustably support the hitch-end of the mobile housing assembly 104 during non-use, and assists in attachment of mobile housing assembly 104 to the towing vehicle 108.

Figure 2A:
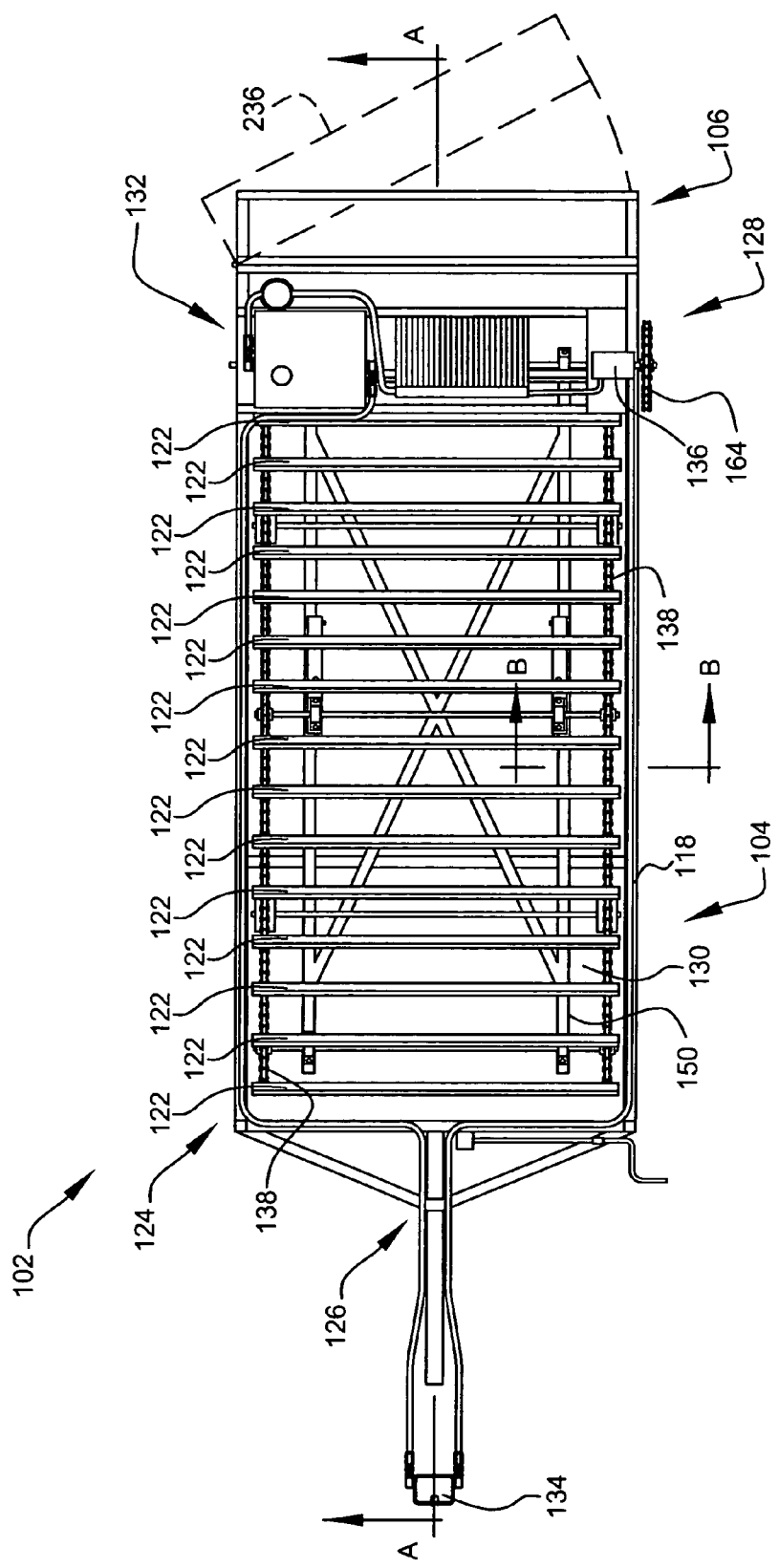
FIG. 2A shows a top view of the soil separator of FIG. 1.
Figure 2B:
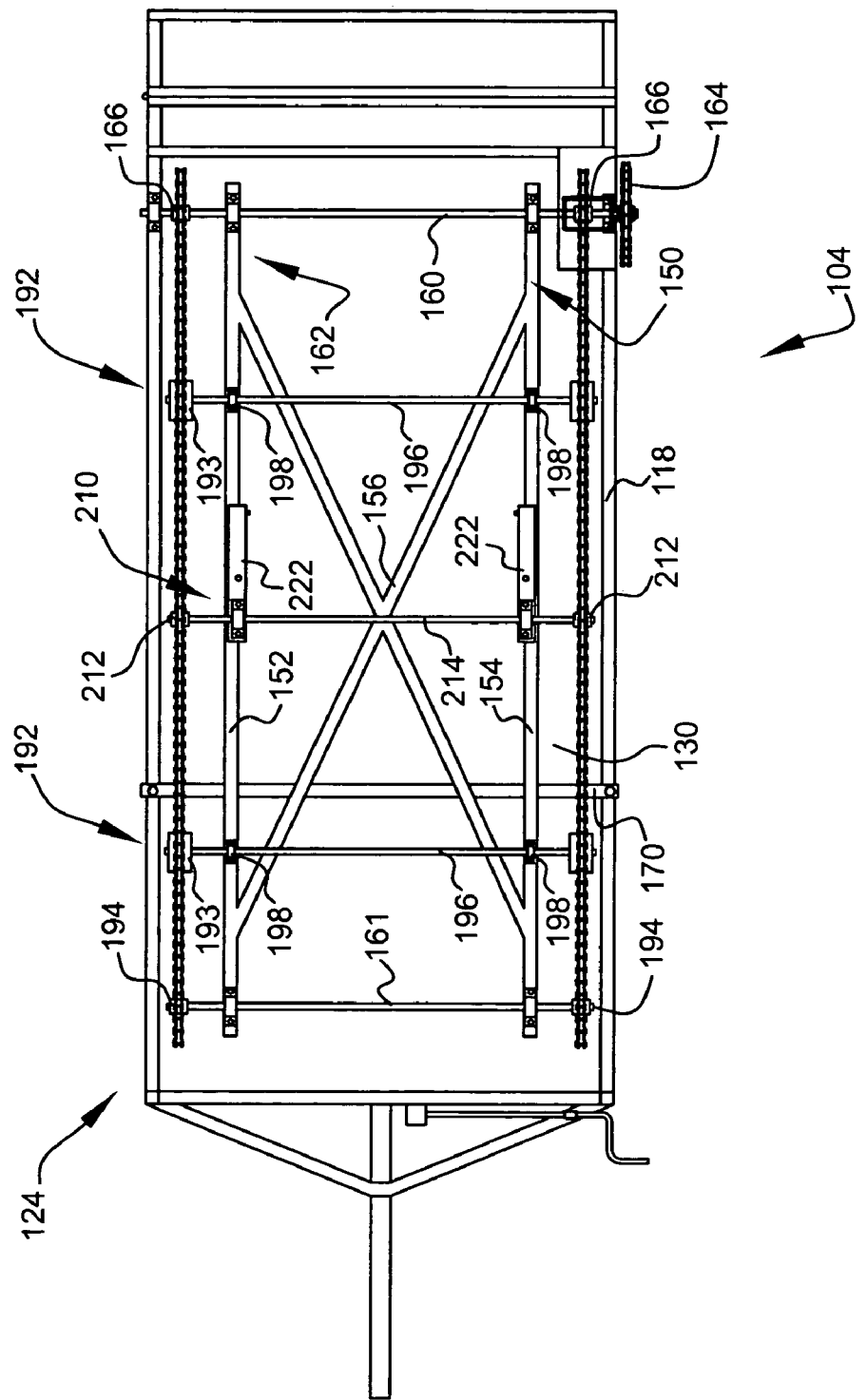
FIG. 2B shows a top view of the soil separator of FIG. 2A, with the paddles removed for clarity.

FIG. 2A shows a top view of the soil separator 102 of FIG. 1. FIG. 2B shows a top view of the soil separator 102 of FIG. 2A, with paddles 122 removed for clarity. Reference is now made to FIG. 2A with continued reference to FIG. 1. Preferably, soil separator 102 comprises flight assembly 124, as shown. Preferably, flight assembly 124 comprises a plurality of chains 138, a plurality of paddles 122, and a hydraulic system 132, as shown. Additionally, soil separator 102 preferably comprises a support structure 150 adapted to be pivotable about an axle 160, as best shown in FIG. 2B.

Preferably, each of the paddles 122 is mounted to the two chains 138 of the flight assembly 124, as shown. Preferably, each chain 138 comprises a heavy-duty "elevator" chain of the type known in the mining industry. Upon reading the teachings of this specification, those with ordinary skill in the art will now understand that, under appropriate circumstances, considering such issues as advances in technology, user preference, etc., other chain or conveyor belt arrangements, such as other types of chains, other types of conveyor belts, etc., may suffice.

Preferably, attachment of the paddles 122 to the chains 138 is accomplished using sets of special chain links comprising connectors identified as chain shoes 123 (see FIG. 13 and FIG. 14). Preferably, attachment of a single paddle 122 to the flight assembly 124 is accomplished using two chain shoes 123, one chain shoe 123 located at each chain 138, as shown. Preferably, chain shoes 123 are rigidly mounted to the chains 138, with all chain shoes 123 spaced essentially equally along the length of the chains 138, as shown. Preferably, each set of chain shoes 123 is adapted to allow a removable attachment of an end portion of a paddle 122 to a chain 138, preferably by bolting, as also shown in FIG. 13 and FIG. 14.

Preferably, each paddle 122 is fabricated from a steel angle sized at about 3 inches by 3 inches with a thickness of about ¼ inch. Preferably, the flight assembly 124 of the embodiment of FIG. 2A comprises about 30 paddles 122, as shown. Preferably, each paddle 122 comprises an end-to-end length of about 71 inches (for the six-foot width mobile housing assembly 104 described herein). Upon reading the teachings of this specification, those with ordinary skill in the art will now understand that, under appropriate circumstances, considering such issues as advances in technology, user preference, etc., other arrangements, such as other means of attaching the paddles to the conveyor belt or chain, other paddle sizes and dimensions, other numbers of paddles, etc., may suffice.

Reference is now made to FIG. 2B with continued reference to FIG. 2A. Preferably, the flight assembly 124 comprises a support structure 150, as shown, preferably comprising a pair of parallel structural members 152 and 154, preferably comprising an X-shaped cross-member 156 situate between parallel structural member 152 and structural member 154, as shown. Preferably, the X-shaped cross-member 156 provides additional support and rigidity to the support structure 150, as shown. Upon reading the teachings of this specification, those with ordinary skill in the art will now understand that, under appropriate circumstances, considering such issues as advances in technology, user preference, intended use, etc., other support structure shapes may suffice.

Preferably, support structure 150 is supported on mobile housing assembly 104 by axle 160 and cross-member support 170, as shown.

Preferably, support structure 150 supports: axle 161 with sprockets 194, on the front portion of support structure 150; two tracking wheel assemblies 192; and chain tensioner assembly 210, as shown. Upon reading the teachings of this specification, those with ordinary skill in the art will now understand that, under appropriate circumstances, considering such issues as advances in technology, user preference, intended use, etc., other flight assembly (also referred to as a soil pusher or powered pusher) components, such as more or fewer tracking wheel assemblies, other types of chain guides, other types of chain tensioner assemblies, other types of supports, etc., may suffice.

Figure 2C:
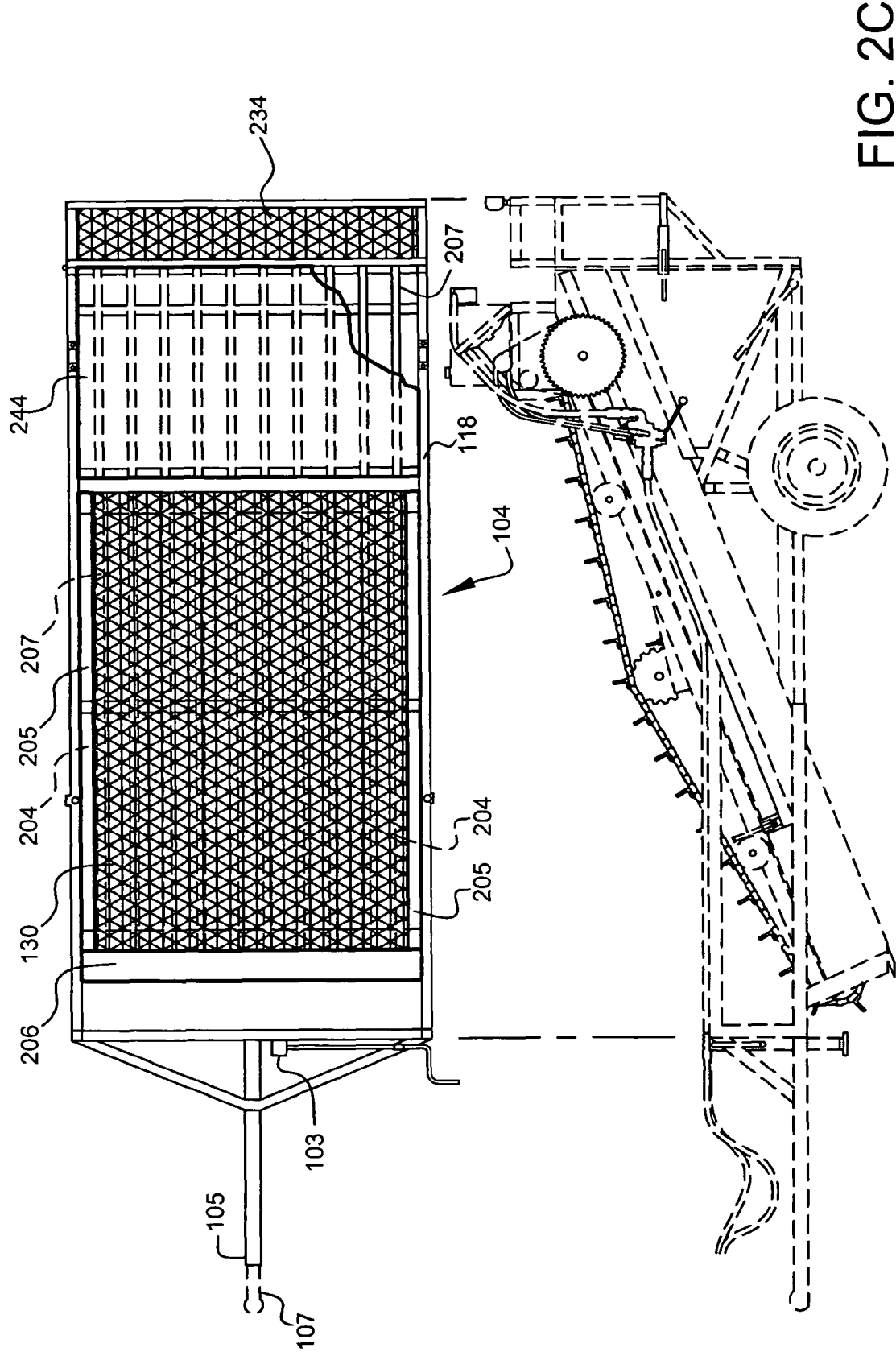
FIG. 2C shows a top view of the soil separator of FIG. 2A, with the flight assembly and hydraulic system removed for clarity.

FIG. 2C shows a top view of the soil separator 102 of FIG. 2A, with the flight assembly 124 and the hydraulic system 132 removed for clarity. A side elevation view of the soil separator 102 is also shown (in dashed lines) aligned below the top view as a reference aide. Preferably, the mobile housing assembly 104 supports the scraper 206, the stationary screen 130, and the sloped bottom portion 244, as shown. Preferably, the scraper 206 is connected to the mobile housing assembly 104 at the front edge of the stationary screen 130, as shown. Preferably, the scraper 206 is bolted to the mobile housing assembly 104. Preferably, the sloped bottom portion 244 (partially cut-away to show the underlying support members) comprises a solid metal sheet that is preferably connected, preferably weld-connected, to the mobile housing assembly 104, as shown.

Preferably, the stationary screen 130 is removably connected, preferably bolted, to the mobile housing assembly 104, as best shown in FIG. 14. Preferably, the stationary screen 130 comprises openings sized to permit selected soil particles to fall through. Preferably, the stationary screen 130 comprises woven metal mesh. Preferably, the stationary screen 130 is interchangeable with stationary screens having other opening sizes adapted to select and pass other sizes of particles (at least embodying herein the step of selecting at least one particle size). Upon reading the teachings of this specification, those with ordinary skill in the art will now understand that, under appropriate circumstances, considering such issues as advances in technology, user preference, etc., other stationary screens (also called screen, separator, or fixed screen), such as punched metal screens, stretched metal screens, other screen materials, screens having multiple opening sizes, multi-layered screens, etc., may suffice.

FIG. 3 shows a sectional view through the section A-A of FIG. 2A. For clarity, portions of the X-shaped cross-member 156 have been omitted from the view. Preferably, support structure 150 is rotatably supported by axle 160 (that is preferably stably supported by the mobile housing frame 118) and by cross-member support 170, as shown.

Preferably, the flight assembly 124 rotates in the manner of an endless belt to lift material from the front 126 of the mobile housing assembly 104 upwardly across the stationary screen 130, as shown. Preferably, during operation, the paddles 122 push the unselected debris towards the rear 128 of the mobile housing assembly 104, and into the discard bin 106, as shown.

Preferably, the stationary screen 130 is supported by the mobile housing assembly 104 at an angle of between about 30-degrees to about 40-degrees, more preferably between about 35-degrees to about 37-degrees, relative to the ground. The angle of the stationary screen 130 changes depending on the depth to which the soil is being sifted. Upon reading the teachings of this specification, those with ordinary skill in the art will now understand that, under appropriate circumstances, considering such issues as advances in technology, user preference, etc., other arrangements, such as other speeds, other angles, etc., may suffice.

Preferably, the unprocessed soil 101 comprises a layer of particles that may be dug or plowed, such as, for example, topsoil, dirt, loam, silt, sand, clay, artificial soil mixes, soil substitutes, organic matter, etc. Preferably, the unprocessed soil 101 comprises selected soil 245 and unselected soil 246, as shown. Preferably, the selected soil 245 is the component of the unprocessed soil 101 that has particle sizes smaller than or equal to a chosen particle size, for example, a horse racetrack may prefer a selected soil 245 in a range of about $\frac{1}{16}$ inches to about 2 inches in diameter.

Preferably, the unselected soil 246 is the component of the unprocessed soil 101 that has particle sizes larger than the chosen particle size, such as, for example: rocks; hard soil aggregates; man-made materials, and debris such as horseshoes, trash, seaweed, shells, roots, etc. Preferably, the soil separating system 100 removes the unselected soil 246 from the unprocessed soil 101, returns the selected soil 245 to the ground, and retains the unselected soil 246 for disposal, as shown. Preferably, the selected particle size is chosen according to the intended use of the selected soil 245, such as, for example, as a racetrack surface, playing field, crop field, tourist beach, etc. Upon reading the teachings of this specification, those with ordinary skill in the art will now understand that, under appropriate circumstances, considering such issues as advances in technology, user preference, etc., other soils, such as compost, shell beaches, lava beaches, vermiculite, crushed ores, etc., may suffice.

Figure 4:
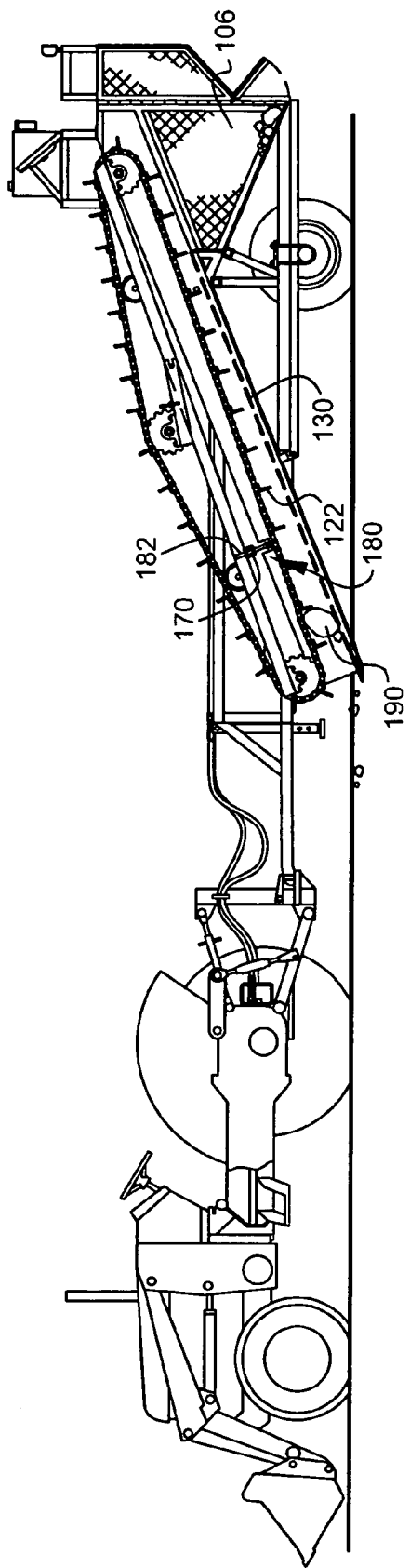
FIG. 4 shows a sectional view through section A-A of FIG. 2A illustrating the jamming reduction system in operation.
Figure 5:
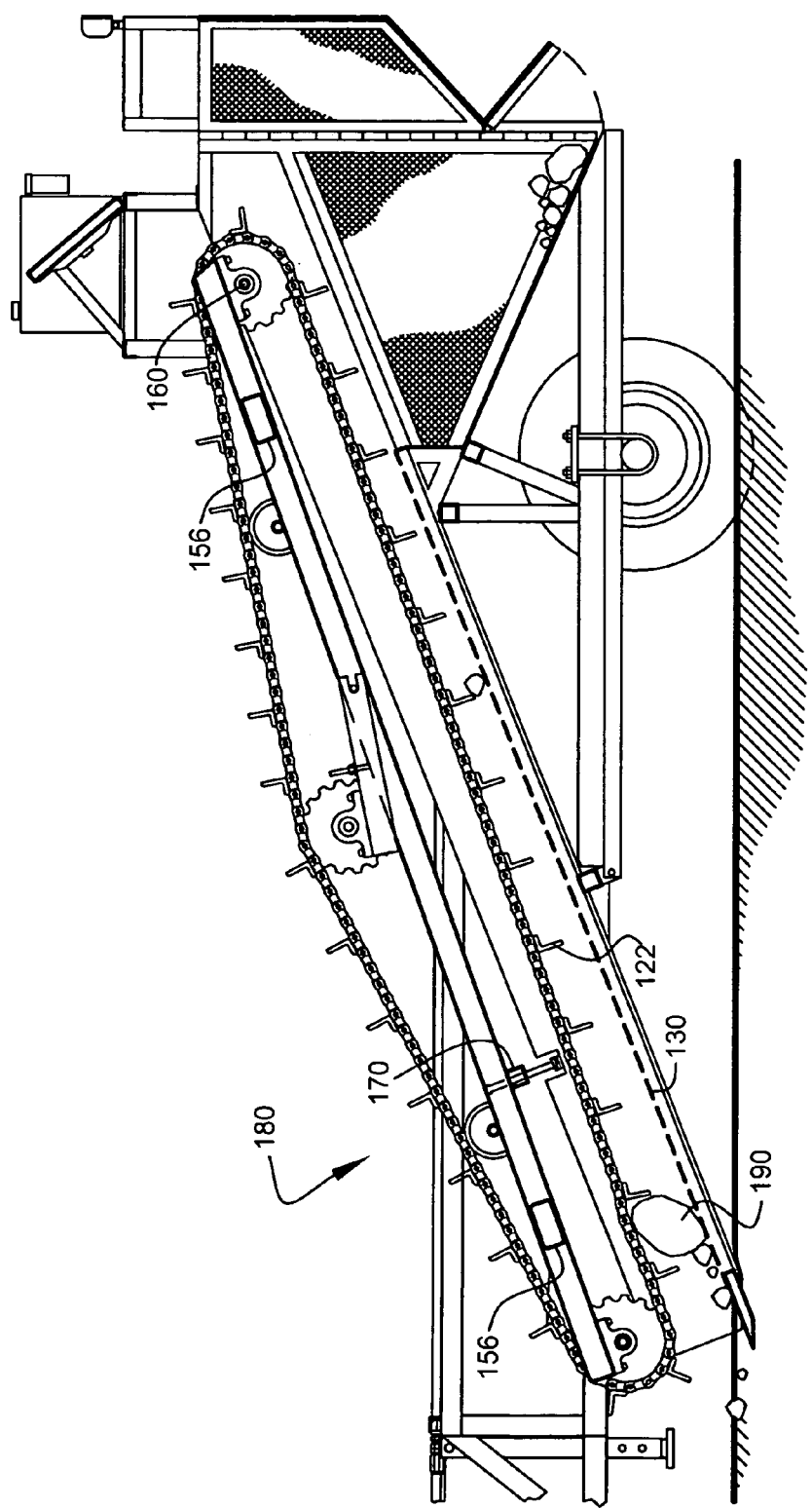
FIG. 5 shows a detailed sectional view of the jamming reduction system of FIG. 4 in operation.
Figure 6:
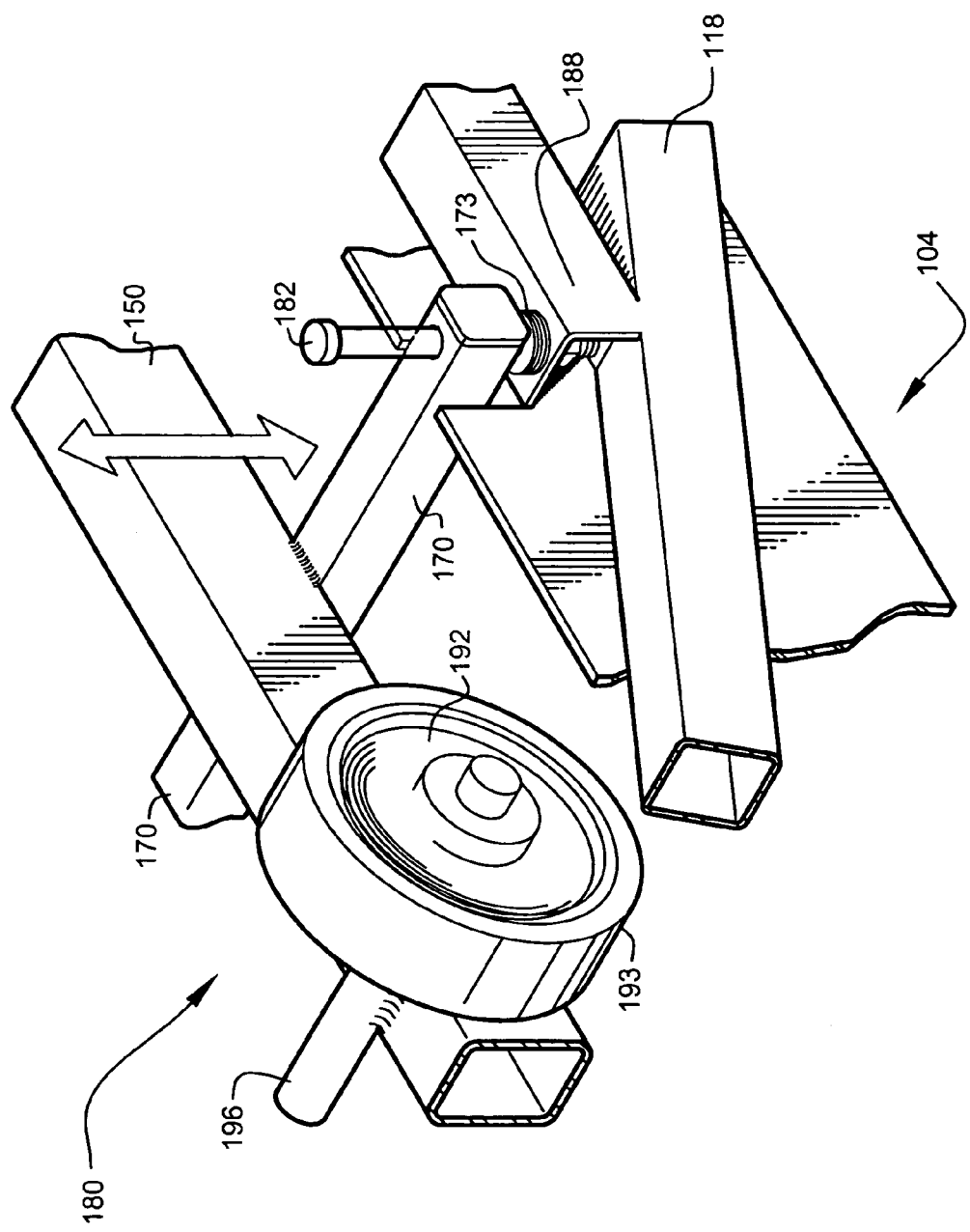
FIG. 6 shows a detailed sectional view, through a portion of the section A-A of FIG. 2A, especially illustrating preferred arrangements of the jamming reduction system of FIG. 4.

FIG. 4 shows a sectional view, through the section A-A of FIG. 2A illustrating a jamming reduction system 180 in operation. FIG. 5 shows a detailed view of the jamming reduction system 180 in operation. FIG. 6 shows a detailed sectional view, through a portion of the section A-A of FIG. 2A, especially illustrating preferred arrangements of the jamming reduction system 180 of FIG. 4. For clarity, portions of the X-shaped cross-member 156 have been omitted from the view.

Preferably, the jamming reduction system 180 provides a means for reducing debris and rock jamming between the paddles 122 and the stationary screen 130, as shown. Preferably, the jamming reduction system 180 comprises the cross-member support 170, preferably supporting the support structure 150 of the flight assembly 124 and is movably retained on a pin retainer 182, as shown. Preferably, the cross-member support 170 is movably captured by the pin retainer 182 of the jamming reduction system 180, which functions to guide the motion of support structure 150 relative to mobile housing assembly 104, as shown. Preferably, the cross-member support 170 comprises an aperture (not shown) through which the pin retainer 182 passes. Recalling that the flight assembly 124 is rotatably attached at one end to axle 160 as described above, the jamming reduction system 180 allows the cross-member support 170 (and support structure 150 of the flight assembly 124) to "float" above the stationary screen 130 during use. Preferably, the pin retainer 182 is attached to a frame member 188 of the mobile housing frame 118, as shown. Preferably, the pin retainer 182 is mechanically attached, preferably by bolting, to the frame member 188, such that pin retainer 182 may be easily replaced if bent. Upon reading the teachings of this specification, those with ordinary skill in the art will now understand that, under appropriate circumstances, considering such issues as material, user preference, manufacturing preference, etc., other pin attachment arrangements, such as use of multiple pins, use of other support structure guides, etc., may suffice.

Preferably, the pin retainer 182 is about a 1-inch diameter solid steel pin, preferably about 12 inches in length such that the support structure 150 can travel about 10 inches vertically along the pin retainer 182. In such manner, a boulder 190 or debris of less than a 10-inch diameter can travel into the soil separator 102 between the flight assembly 124 and the stationary screen 130 and through to discard bin 106 without jamming flight assembly 124. This arrangement is best shown in FIG. 5 wherein the support structure 150 is raised up along the pin retainer 182 as the boulder 190 is pulled along by the flight assembly 124, as shown. Upon reading the teachings of this specification, those with ordinary skill in the art will now understand that, under appropriate circumstances, considering such issues as advances in technology, user preference, etc., other automatic adjusters and jamming reduction systems, such as spring-loaded chain tensioners, other hinge points, other support structure guides, etc., may suffice.

In addition to reducing jamming, the pin retainer 182 is preferably used to adjust the operational clearance between the paddles 122 and the stationary screen 130. Preferably, adjustments to the paddle-to-screen spacing is accomplished by adding or removing annular spacers 173 positioned over the pin retainer 182, as shown. Preferably, adding annular spacers 173 between cross-member support 170 and the frame member 188 raises the flight assembly 124 thus increasing the operational clearance between the paddles 122 and the stationary screen 130. Conversely, removing annular spacers 173 decreases the paddle-to-screen spacing. This preferred arrangement of spacers allows for periodic adjustment to the flight assembly 124 to account for wear within the paddles 122 and stationary screen 130. Preferably, the annular spacers 173 comprise fender-type washers having an aperture of sufficient diameter to fit over the pin retainer 182, as shown.

Figure 7:
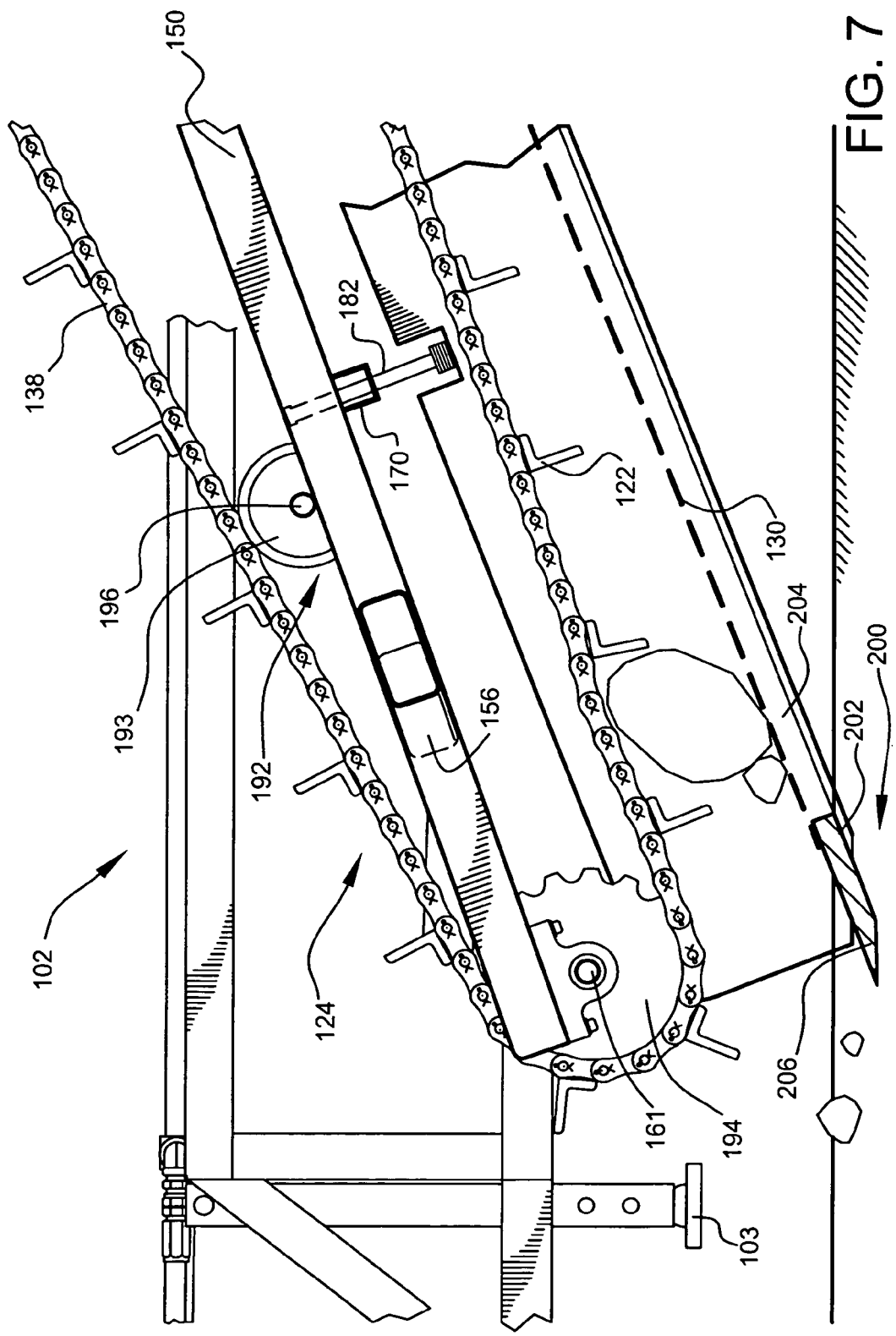
FIG. 7 shows a detailed sectional view, through a portion of the section A-A of FIG. 2A, especially illustrating preferred arrangements of the scraper assembly.

FIG. 7 shows a detailed sectional view, through a portion of the section A-A of FIG. 2A, especially illustrating preferred arrangements of the scraper 206. For clarity, portions of the X-shaped cross-member 156 have been omitted from the view. Preferably, the soil separator 102 comprises a scraper assembly 200, preferably located along the leading edge 202 of the stationary screen frame 204, as shown. Preferably, the scraper assembly 200 comprises the scraper 206, preferably a six-foot long metal scraper blade, for example, a Farm Pro six-foot scraper blade (available from Homier Distributing Company, Inc., of Huntington, Ind., USA).

Preferably, the scraper 206 assists the soil separator 102 by cutting through the soil and guiding the soil and debris into the flight assembly 124, as shown (at least embodying herein the step of collecting such depth of unprocessed soil onto such at least one screen). Preferably, as the soil separator 102 is towed, the scraper 206 is pulled through the soil and soil is continuously lifted onto the scraper 206 where it is continuously pushed upward onto the stationary screen 130 by the paddles 122 on flight assembly 124, as shown (at least embodying herein the step of pushing such unprocessed soil across such at least one screen; and at least embodying herein wherein unprocessed soil is continuously collected and screened as such at least one soil separator is towed through such unprocessed soil; and at least embodying herein whereby such screened soil is cleared of soil particles larger than such at least one particle size). Upon reading the teachings of this specification, those with ordinary skill in the art will now understand that, under appropriate circumstances, considering such issues as user preference, soil screening material, manufacturing preference, etc., other scrapers (also referred to as unprocessed soil collectors), such as multiple scrapers, double-edged scraper blades, scraper blades including ripper shanks, etc., may suffice.

Preferably, the soil separator 102 is towed through the soil at a minimum speed equaling the minimum speed of the tow vehicle 108, up to a maximum speed of about four miles per hour, more preferably between about one-quarter mile per hour and about three miles per hour, depending on the soil condition (at least embodying herein the step of towing such at least one soil separator through such depth of unprocessed soil). Preferably, the scraper assembly 200 slightly overlaps the stationary screen 130, to prevent stationary screen 130 from being snagged by the paddles 122 or soil 101.

Figure 8:
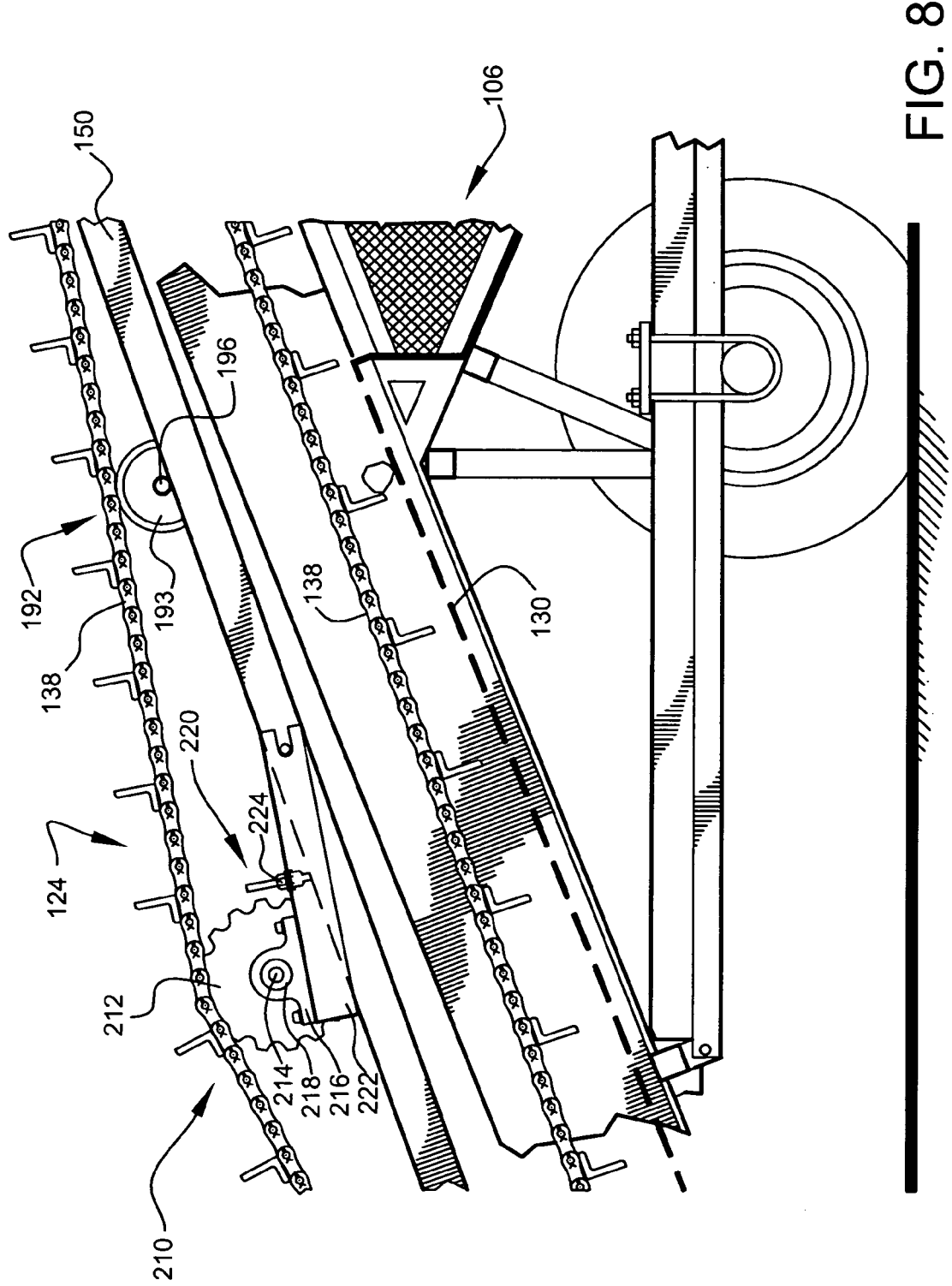
FIG. 8 shows a detailed sectional view, through a central portion of the section A-A of FIG. 2A, especially illustrating preferred arrangements of a chain tensioner assembly.

FIG. 7 also shows a tracking wheel assembly 192, preferably placed about midway between the chain tensioner assembly 210 (as shown in FIG. 2B and FIG. 8) and the front wheel sprocket 194 of axle 161, as shown. Preferably, flight assembly 124 comprises a tracking wheel assembly 192 on each side of each of the chain 138, as shown. The tracking wheel assembly 192 preferably comprises two hardened rubber wheels 193 positioned at either end of an axle 196, as shown. Preferably, the wheel 193 supports and guides the chain 138, as shown. Preferably, the axle 196 is adapted to support the tracking wheel assemblies 192 adjacent each chain 138, as shown. Preferably, the axle 196 is mechanically attached to support structure 150 using axle retainers 198, as shown. In an alternate preferred embodiment, axle 196 is welded to support structure 150. Upon reading the teachings of this specification, those with ordinary skill in the art will now understand that, under appropriate circumstances, considering such issues as user preference, manufacturing preference, durability, chain length, etc., other tracking wheel devices, such as chain sprockets, guide channels, etc., may suffice.

FIG. 8 shows a detailed sectional view, through a central portion of the section A-A of FIG. 2A, especially illustrating preferred arrangements of a chain tensioner assembly 210. For clarity, portions of the X-shaped cross-member 156 have been omitted from the view. Preferably, the flight assembly 124 comprises two chain tensioner assemblies 210, one for each chain 138, preferably situate along the support structure 150, as shown. Preferably, each chain tensioner assembly 210 comprises one sprocket 212 situate in about the center of each respective chain 138, as shown. Preferably, a single axle 214 connects the two chain tensioner assemblies 210 at the two sprockets 212 and assists in stabilizing the sprockets 212 during operation of the soil separator 102, as shown. Preferably, the axle 214 is attached to the support structure 150 using axle retainers 216 on the levers 222, as shown. Preferably, each axle retainer 216 is bolted to a respective lever 222, as shown. Preferably, each axle retainer 216 comprises a center bearing 218 that assists keeping the axle 214 stable and secure during rotation, as shown.

Preferably, each chain tensioner assembly 210 further comprises a tension adjuster mechanism 220, as shown. Preferably, the tension adjuster mechanism 220 comprises a simple pair of levers 222, one lever 222 hingedly connected on each respective side of the support structure 150, as shown. Preferably, an adjusting nut and bolt assembly 224 is used to set the height of each lever 222 above the support structure 150, thereby raising the axle 214 and causing the sprockets 212 to push against each respective chain 138, thus tensioning the chains 138, as shown. Preferably, each respective chain 138 may be tensioned separately, while the axle 214 assists maintaining a constant rigidity to the chain tensioner assembly 210 during operation of the soil separator 102, as shown.

Upon reading the teachings of this specification, those with ordinary skill in the art will now understand that, under appropriate circumstances, considering such issues as economic consideration, user preference, manufacturing preference, durability, chain length, etc., other chain tensioning methods, such as multiple chain tensioners, in-line chain tensioning, separate chain tensioners, non-parallel chain tensioners, etc., may suffice.

FIG. 8 also shows a second tracking wheel assembly 192, preferably placed about midway between the axle 160 and the chain tensioner assembly 210, preferably located on each side of the support structure 150, as shown.

Figure 9:
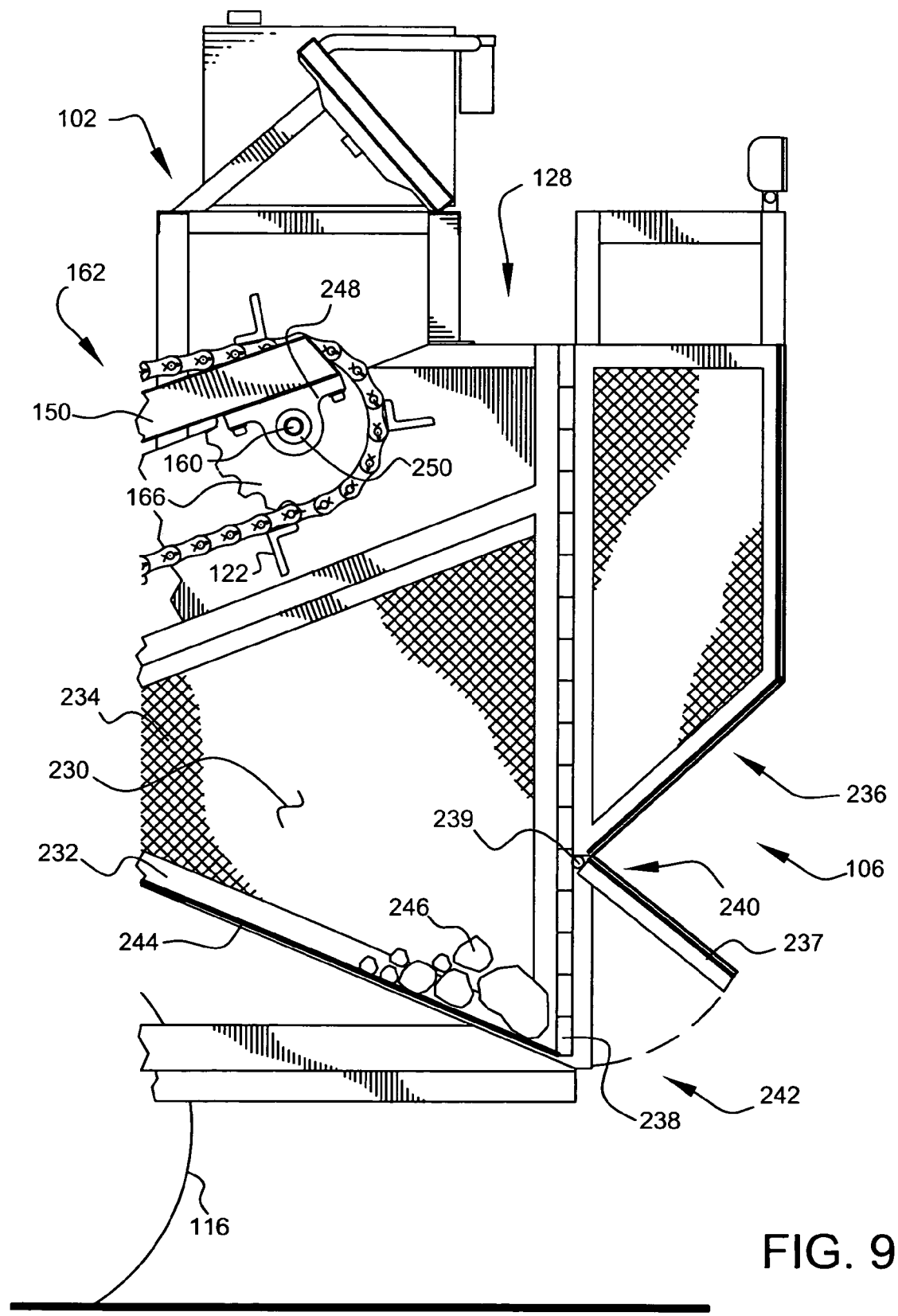
FIG. 9 shows a partial sectional view through the section A-A of FIG. 2A illustrating the rear portion of the soil separator.

FIG. 9 shows a partial sectional view through the section A-A of FIG. 2A illustrating the rear portion 128 of the soil separator 102. Preferably, the rock and debris not small enough to pass through the stationary screen 130 is pushed into the discard bin 106 by the paddles 122, as shown. Preferably, the discard bin 106 comprises an enclosure 230, as shown, preferably comprising a heavy-duty frame 232 and heavy mesh sides 234, as shown, preferably comprising all steel construction, preferably coated or painted steel to reduce corrosion. Preferably, the heavy mesh sides 234 are connected, preferably weld-connected, to the heavy-duty frame 232. Upon reading the teachings of this specification, those with ordinary skill in the art will now understand that, under appropriate circumstances, considering such issues as user preference, material, etc., other types of connections, such as mechanical fasteners, etc., may suffice. Preferably, the discard bin 106 comprises an access gate 236 that further comprises a dump gate 237, as shown. Preferably, the access gate 236 comprises the same heavy-duty frame 232 and steel mesh construction as the remainder of the discard bin 106, as shown. Preferably, the access gate 236 is hinged, preferably using a heavy-duty piano-style hinge 238, on one side of the access gate 236 to allow access gate 236 to fully swing open to provide complete access to the interior of discard bin 106, as shown. Upon reading the teachings of this specification, those with ordinary skill in the art will now understand that, under appropriate circumstances, considering such issues as advances in technology, user preference, etc., other arrangements, such as other materials, other hinge placements, other types of hinges, other types of gates, etc., may suffice.

Preferably, access gate 236 further comprises the dump gate 237, situate along the bottom 242 of the access gate 236, as shown. Preferably, the top portion 240 of the dump gate 237 comprises a hinge 239, such that dump gate 237, when unlatched, allows the contents of discard bin 106 to "dump" from discard bin 106, as shown. Preferably, the discard bin 106 comprises a sloped bottom portion 244 that assists the discard bin material 246 to gravitationally fall when the dump gate 237 is opened, as shown. Upon reading the teachings of this specification, those with ordinary skill in the art will now understand that, under appropriate circumstances, considering such issues as advances in technology, user preference, etc., other debris dumping mechanisms, such as hydraulic dumping, a bin towed behind the mobile housing assembly, etc., may suffice.

Further, FIG. 9 shows the axle 160 attachments on the rear portion 162 of the support structure 150. As previously stated, the axle 160 is attached to drive sprocket 164 (see FIG. 10) and comprises two chain sprockets 166 positioned near either end of the axle 160, as shown. Preferably, the axle 160 is attached to support structure 150 using an axle retainer 248, as shown. Preferably, the axle retainer 248 comprises a center bearing 250 that assists keeping the axle 160 secure while allowing rotation of the axle 160, as shown. Preferably, the axle 160 is supported by the mobile housing assembly 104 near each end of the axle 160 (as shown in FIG. 2B).

Figure 10:
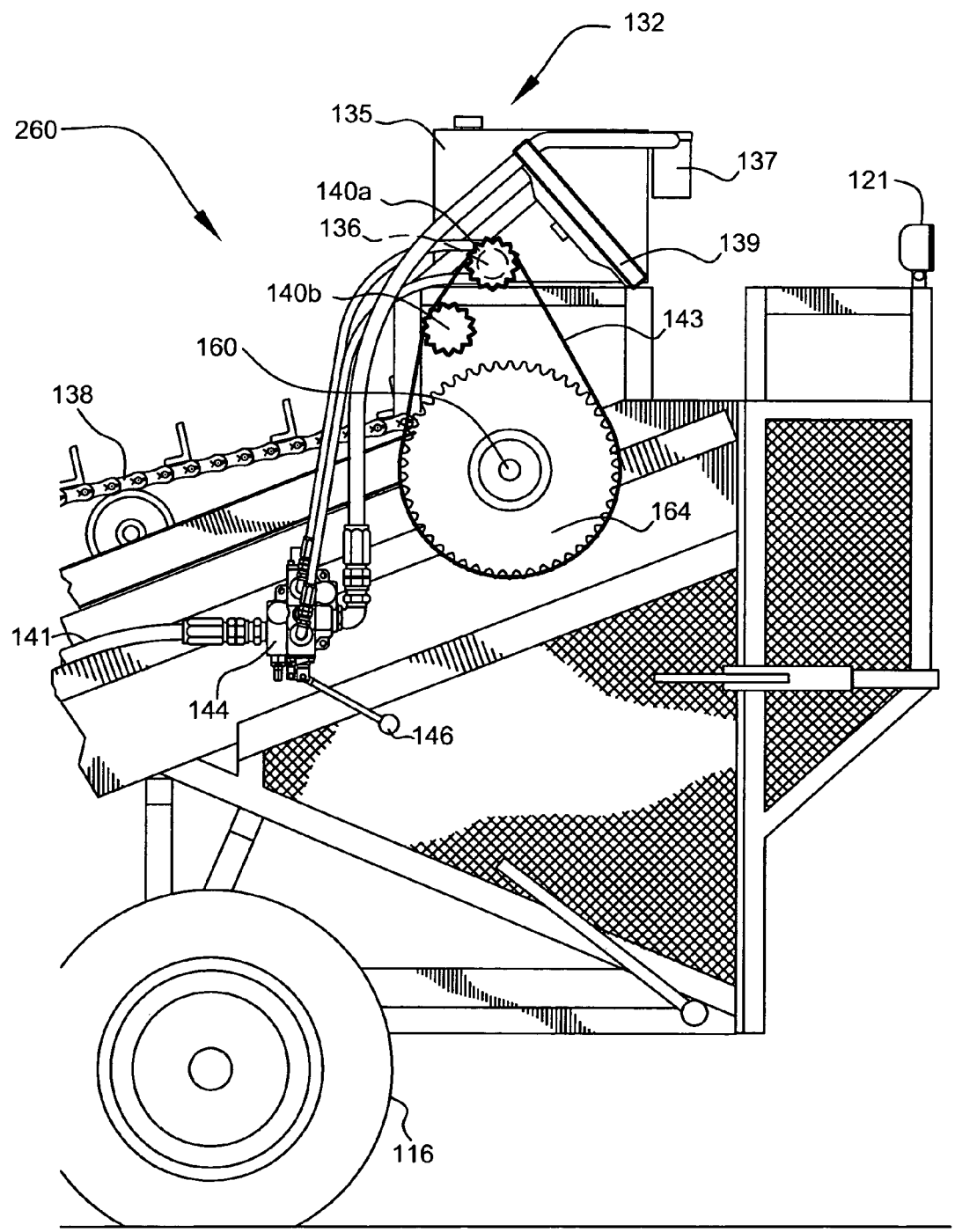
FIG. 10 shows a side elevation view, partially in section, of the drive assembly of FIG. 3.
Figure 11:
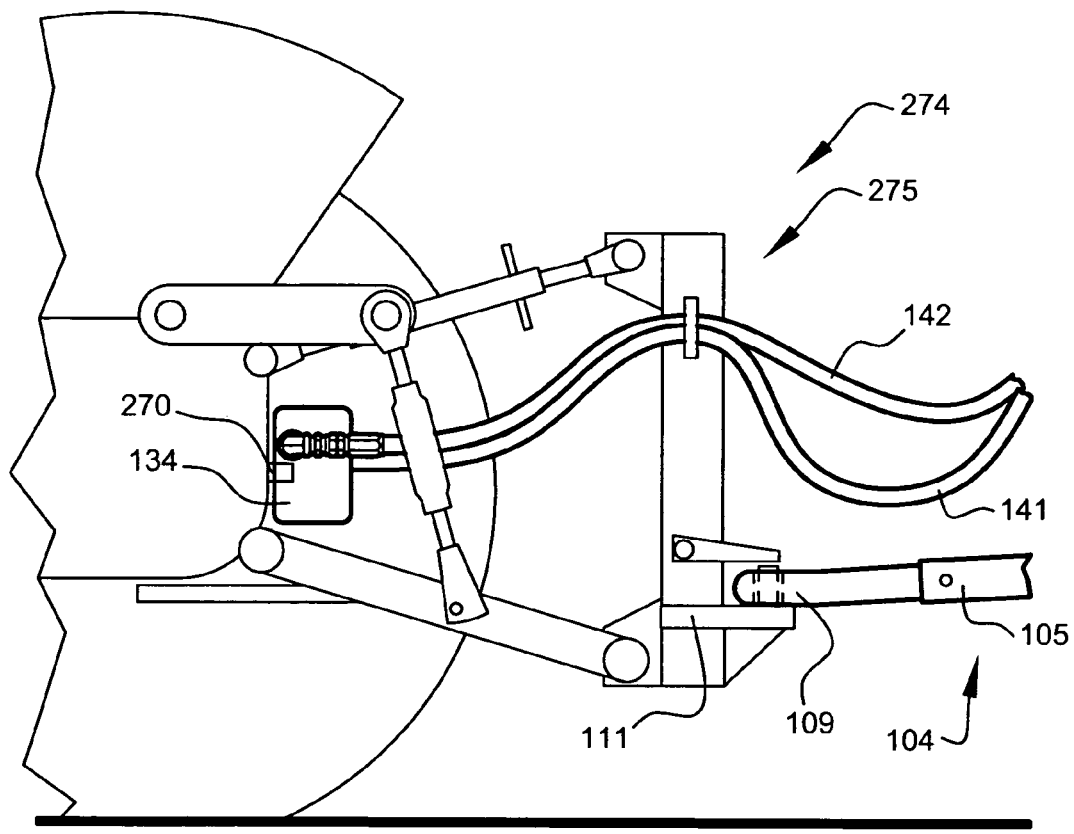
FIG. 11 shows a side elevation view, partially in section, of the power-take-off connection to the tractor of the soil separating system according to a preferred embodiment of the present invention.
Figure 12:
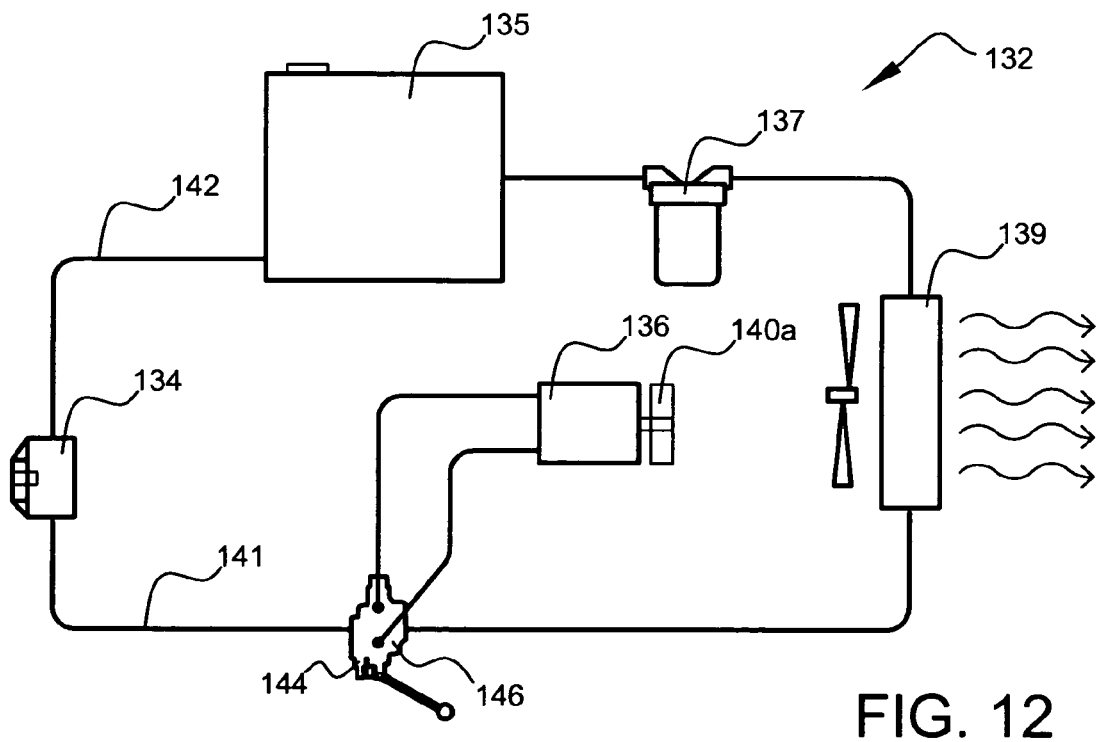
FIG. 12 shows a diagrammatic view of the hydraulic operating system of the soil separating system according to FIG. 10.

FIG. 10 shows a side elevation view, partially in section, of the drive assembly 260 of FIG. 3. FIG. 11 shows a side elevation view, partially in section, of PTO connection 270 to tractor 110 of soil separating system 100 according to a preferred embodiment of the present invention. FIG. 12 shows a diagrammatic view of the hydraulic operating system 132 of the soil separating system 100 according to FIG. 10.

In the following discussion, specific reference is made to FIG. 10. In operation, the drive assembly 260 provides power to drive the flight assembly 124, preferably by turning the axle 160, thereby turning the chain sprockets 166, which move the chains 138, as shown. Preferably, the chains 138 carry the paddles 122 that pushes soil across the stationary screen 130. Preferably, selected soil falls through the stationary screen 130 onto the ground (at least embodying herein wherein the selected soil falls through such separator means; and at least embodying herein wherein the selected soil falls through such at least one separator; and at least embodying herein the step of allowing the soil particles smaller than such at least one particle size to fall through such at least one screen). Preferably, the unselected soil is pushed by the paddles 122 into the discard bin 106 (at least embodying herein wherein the unselected soil is moved across such separator means and into such holder means; and at least embodying herein wherein the unselected soil is moved across such at least one separator and into such at least one holder; and at least embodying herein the step of pushing the soil particles larger than such at least one particle size across such at least one screen and into at least one holder), as shown.

Preferably, the drive assembly 260 comprises the sprocket gears 140a and 140b, a drive chain 143, and a hydraulic system 132 which comprises a pump 134 (see FIG. 11 and FIG. 12), a motor 136, a pressure hose 141, a drain hose 142, and a controller system 146 comprising an internal pressure relief valve 144, as shown. Preferably, the drive assembly 260 is adapted to rotate the flight assembly 124 at about 10 revolutions per minute (rpm) when the PTO connector 270 is rotating at about 540 rpm. Preferably, the hydraulic system 132 further comprises reservoir 135, filter 137, and fluid radiator 139, as shown. Upon reading the teachings of this specification, those with ordinary skill in the art will now understand that, under appropriate circumstances, considering issues such as, load demands, hydraulic fluid type, etc., other component arrangements, such as, for example, providing a system without a fluid radiator, etc., may suffice.

Preferably, the pump 134 comprises a tractor-type PTO pump, as shown. More preferably, pump 134 is a 33 gallonper-minute PTO tractor pump, generating about 1300 pounds per square inch (psi), with about a 1⅛ inch inlet (from the drain hose 142) and about a one-inch outlet (to pressure the hose 141). Preferably, the pump 134 is powered by a standard PTO 270 located on the towing vehicle 108, as shown, which preferably runs at about 540 revolutions per minute, at full power. Preferably, the hydraulic system 132 uses hydraulic oil.

Upon reading the teachings of this specification, those with ordinary skill in the art will now understand that, under appropriate circumstances, considering such issues as advances in technology, user preference, etc., other pumps and other hydraulic pumps, such as a pump self-contained on the mobile housing assembly, pumps of other sizes, direct connection to a towing vehicle's hydraulic system, a self-propelled and self-powered soil separator, etc., may suffice.

Preferably, the pump 134 drives the motor 136, which turns sprocket gear 140*a*, which turns the chain 143 and the sprocket gear 140*b* (which helps to guide the chain 143), as shown. Preferably, the chain 143 turns the drive sprocket 164, which turns the axle 160, as shown. Preferably, the motor 136 comprises a 33-gallon per minute (GPM), 1300-psi hydraulic motor, providing about 16 horsepower at full power. Upon reading the teachings of this specification, those with ordinary skill in the art will now understand that, under appropriate circumstances, considering such issues as advances in technology, user preference, etc., other arrangements, such as other sizes of hydraulic motor, other types of motors and hydraulic motors, a direct drive shaft from the motor to the axle, other hydraulic system pressures, other gear ratios, etc., may suffice.

Preferably, the controller system 146 comprises a four-way single-spool control valve, with floats, as shown, such as, for example, Item #2032, available from Northern Tool & Equipment Catalog Co., of Burnsville, Minn., USA. Preferably, the controller system 146 provides forward, reverse, and idle power states to the motor 136, so that the flight assembly 124 may be halted or reversed to clear jams, if required. Preferably, the controller system 146 comprises the pressure relief valve 144, as shown. Preferably, the pressure relief valve 144 is set to relieve hydraulic pressure on the motor 136 if the hydraulic system 132 reaches about 700 psi. Upon reading the teachings of this specification, those with ordinary skill in the art will now understand that, under appropriate circumstances, considering such issues as advances in technology, user preference, etc., other hydraulic controls, such as additional pressure relief valves, other controller valves, other relief pressure settings, etc., may suffice.

Preferably, the reservoir 135 comprises a hydraulic fluid reservoir having a capacity of about 33-gallons. Preferably, filter 137 comprises a hydraulic fluid filter of the type known in the art of hydraulics. Preferably, the fluid radiator 139 comprises a hydraulic fluid heat-transfer system that uses a hydraulic motor, or electrical power derived from the towing vehicle, to circulate air over oil-filled heat-exchange tubes of the radiator. Upon reading the teachings of this specification, those with ordinary skill in the art will now understand that, under appropriate circumstances, considering such issues as advances in technology, user preference, etc., other hydraulic system arrangements, such as multiple filters, other reservoir sizes, other hydraulic fluid cooling methods, etc., may suffice.

Preferably, the soil separating system 100 comprises a system of towing lights, preferably a set of brake lights 121, as shown, preferably adapted to connect to the electrical system of the towing vehicle. Upon reading the teachings of this specification, those with ordinary skill in the art will now understand that, under appropriate circumstances, considering issues such as, intended use, local regulations regarding towed vehicles, etc., other electrical arrangements, such as, for example, the inclusion of active braking systems, a system of area work lights, etc., may suffice.

With reference to the detailed illustration of FIG. 11, preferably, soil separating system 100 comprises a tractor 110, as shown. Preferably, the tractor 110 comprises PTO connection 270, as shown. Preferably, the PTO connection 270 is a rotating shaft powered by the tractor 110, as shown. Typically, the PTO connection 270 rotates at about 540 revolutions per minute, during operation, to provide adequate hydraulic pressure to operate the system; however, the speed of rotation of the PTO is generally controlled by tractor controls located within easy access of the tractor operator, such that, the hydraulic pressure and thereby the flight assembly 104 operation speed, may be controlled by such operator by means of the PTO rotational speed. Upon reading the teachings of this specification, those with ordinary skill in the art will now understand that, under appropriate circumstances, considering such issues as advances in technology, user preference, etc., other arrangements, such as other types of power supplies, other PTO rotation speeds, etc., may suffice.

Preferably, the tractor 110 comprises a hydraulic lift hitch 274, as shown. Preferably, the hydraulic lift hitch 274 comprises a three-point hitch 275, as shown. Preferably, the three-point hitch 275 is a standard three-point tractor hitch that is raised and lowered by the hydraulic system of the tractor 110. Preferably, the three-point hitch 275 raises and lowers the front end of the mobile housing assembly 104, thereby adjusting the depth at which the scraper 206 cuts the soil, as shown (at least embodying herein the step of selecting at least one depth of unprocessed soil to collect). This arrangement comprises the preferred means of adjusting the depth of soil processed by soil separator 102. Upon reading the teachings of this specification, those with ordinary skill in the art will now understand that, under appropriate circumstances, considering such issues as advances in technology, user preference, etc., other height-adjustable hitches, such as mechanical lift hitches, manually adjustable hitch heights, etc., may suffice. Furthermore, upon reading the teachings of this specification, those with ordinary skill in the art will now understand that, under appropriate circumstances, considering such issues as advances in technology, user preference, etc., other depth selectors, such as other methods of adjusting the height of the front end of the mobile housing assembly, other methods of adjusting the depth of the scraper, etc., may suffice.

Preferably, the front end of the mobile housing assembly 104 comprises a 2-inch square insert receiver 105, as shown. Preferably, when the mobile housing assembly 104 is being towed on the street, a standard tow ball mount 107 is inserted into the receiver 105, as shown in FIG. 2C, which attaches to a standard truck tow-ball, as is known in the art of towing. During transportation towing, the front end of the mobile housing assembly 104 must be raised high enough to provide adequate clearance between the ground and the scraper 108. Preferably, when the mobile housing assembly 104 is being towed by a tractor 108 and is sifting soil, a standard heavy-duty lunette ring mount 109 is inserted into the receiver 105 and attaches to a pintle-ring receiver 111 mounted on the three-point hitch 275, as shown. Pintle-hitches are preferred for their strength and versatility in movement. Upon reading the teachings of this specification, those with ordinary skill in the art will now understand that, under appropriate circumstances, considering such issues as advances in technology, user preference, etc., other hitches, such as a fifth-wheel hitch, drawbar, pin hitch, permanent connections, etc., may suffice.

Referring specifically to FIG. 12, the diagram of FIG. 12 provides an overall depiction of the hydraulic circuit of soil separating system 100. Upon reading the teachings of this specification, those with ordinary skill in the art will now understand that, under appropriate circumstances, considering such issues as advances in technology, user preference, etc., other hydraulic power system arrangements may suffice.

FIG. 13 shows a sectional view trough the section B-B of FIG. 2A illustrating the flight assembly 124 of the soil separating system 100 according to a preferred embodiment of the present invention. Preferably, the paddles 122 are attached to the chain 138 with the chain shoes 123, as shown.

Preferably, the tension adjuster mechanism 220 adjusts the tension on the chain 138, as shown. Preferably, the chain 138 is guided by the sprocket 212, which is preferably connected to the axle 214, as shown. Preferably, the axle retainer 216 connects the axle 214 to the lever 222, as shown. Preferably, the lever 222 is hingedly connected to the support structure 150, preferably by the hinge 223, as shown.

FIG. 14 shows a sectional view trough the section B-B of FIG. 2A illustrating the mobile housing assembly 104, stationary screen 130, and flight assembly 124 of the soil separating system 100 according to a preferred embodiment of the present invention. Preferably, the stationary screen frame 204 is part of the mobile housing assembly 104, as shown. Preferably, the stationary screen 130 is connected to the stationary screen frame 204, as shown (at least embodying herein the step of installing at least one screen having openings of such at least one particle size in at least one soil separator), preferably by bolting a screen retainer 205, through the stationary screen 130, to stationary screen frame 204. Preferably, the stationary screen 130 is supported underneath by the supports 207, as shown, which are preferably welded to the mobile housing assembly 104.

Preferably, when the wear along the length of a paddle 122 becomes excessive, the paddle 122 can be unbolted from the chain shoes 123, turned to use the previously bolted side as the pusher and the previously pusher side as the bolted side, and be re-bolted to the chain shoes 123 through the bolt-holes 209, as shown.

Although FIG. 13 and FIG. 14 are properly aligned horizontally, the vertical distance between FIG. 13 and FIG. 14 is not to scale.

Embodying

Mobile housing assembly 104 at least embodies herein at least one housing vehicle adapted to house; and at least embodies herein housing vehicle means for housing such separator means in at least one vehicle; and at least embodies herein at least one housing vehicle adapted to house such at least one separator in at least one vehicle; and at least embodies herein wherein such at least one housing vehicle is adapted to be towed by at least one towing vehicle during sifting; and at least embodies herein wherein such at least one housing vehicle is adapted to be towed by at least one towing vehicle on city (public) streets.

Discard bin 106 at least embodies herein holder means for holding the unselected soil; and at least embodies herein at least one holder adapted to hold the unselected soil; and at least embodies herein wherein such at least one housing vehicle further comprises such at least one holder; and at least embodies herein wherein such at least one holder comprises at least one bin; and at least embodies herein wherein such at least one bin has a capacity of about 4 cubic yards of unselected soil.

Towing vehicle 108 at least embodies herein at least one towing vehicle; and at least embodies herein at least one towing vehicle having a towing capacity of at least about 500 at least embodies herein 0 pounds; and at least embodies herein at least one towing vehicle adapted to tow such at least one housing vehicle across the unprocessed soil.

Tractor 110 at least embodies herein wherein such at least one towing vehicle comprises at least one tractor.

Paddle 122 at least embodies herein wherein such at least one conveyor belt comprises at least one paddle adapted to push unprocessed soil across such at least one fixed screen.

Flight assembly 124 at least embodies herein soil pusher means for pushing the unprocessed soil over such separator means; and at least embodies herein at least one soil pusher adapted push the unprocessed soil over such at least one separator; and at least embodies herein wherein such at least one soil pusher comprises at least one powered pusher adapted to provide powered pushing movement of the unprocessed soil over such at least one separator; and at least embodies herein at least one powered pusher adapted to push unprocessed soil over such at least one fixed screen.

Stationary screen 130 at least embodies herein separator means for separating the selected soil from the unselected soil on the basis of at least one selected particle-size; and at least embodies herein at least one separator adapted to separate the selected soil from the unselected soil on the basis of at least one selected particle-size; and at least embodies herein wherein such at least one separator comprises at least one screen adapted to screen sift the unselected soil from the selected soil; and at least embodies herein wherein such at least one screen is removable; and at least embodies herein wherein such at least one screen comprises at least one set of interchangeable screens, each respective one of such interchangeable screens adapted to sift at least one size of unselected soil from the selected soil; and at least embodies herein wherein such at least one screen is substantially flat; and at least embodies herein wherein such at least one screen is substantially rigid; and at least embodies herein wherein such at least one screen comprises at least one woven metal sheet comprising at least one open area to permit passage of the selected soil; and at least embodies herein at least one fixed screen adapted to screen unprocessed soil into selected soil and unselected soil on the basis of particle-size; and at least embodies herein wherein such at least one fixed screen is fixed relative to such at least one housing vehicle; and at least embodies herein wherein such at least one separator is fixed relative to such at least one housing vehicle; and at least embodies herein wherein such at least one separator is substantially flat; and at least embodies herein wherein such separator means is fixed relative to such housing vehicle means; and at least embodies herein wherein such separator means is substantially flat.

Hydraulic system 132 at least embodies herein wherein such at least one powered pusher comprises at least one hydraulic power system adapted to hydraulically power such at least one powered pusher; and at least embodies herein wherein such at least one powered pusher comprises at least one hydraulic power system.

Pump 134 at least embodies herein wherein such at least one hydraulic power system comprises at least one hydraulic pump adapted to be powered by at least one power-take-off drive.

Motor 136 at least embodies herein wherein such at least one hydraulic power system comprises at least one hydraulic motor.

Chain 138 at least embodies herein wherein such at least one powered pusher comprises at least one conveyor belt; and at least embodies herein wherein such at least one conveyor belt comprises at least one chain; and at least embodies herein wherein such at least one hydraulic power system comprises at least one conveyor belt.

Axle 160 at least embodies herein wherein such at least one automatic adjuster comprises at least one hinge adapted to adjust the angle between such at least one powered pusher and such at least one separator, wherein such at least one powered pusher is hingedly connected to such at least one housing vehicle adjacent such at least one holder.

Jamming reduction system 180 at least embodies herein wherein such at least one automatic adjuster comprises at least one jamming reducer adapted to reduce jamming between such at least one powered pusher and such at least one separator during sifting of the unprocessed soil.

Pin 186 at least embodies herein at least one automatic adjuster adapted to automatically adjust the distance between such at least one powered pusher and such at least one separator.

Scraper assembly 200 at least embodies herein unprocessed soil collector means for collecting the unprocessed soil onto such separator means; and at least embodies herein at least one unprocessed soil collector adapted to collect the unprocessed soil onto such at least one separator; and at least embodies herein at least one unprocessed soil collector adapted to collect the unprocessed soil onto such at least one fixed screen when such at least one housing vehicle is being towed across the unprocessed soil.

Dump gate 237 at least embodies herein wherein such at least one bin comprises at least one unselected soil dump release.

Hydraulic lift hitch 274 at least embodies herein at least one depth selector adapted to select the depth of the unprocessed soil that is collected by such at least one unprocessed soil collector; and at least embodies herein wherein such at least one depth selector comprises a plurality of soil depth selections between about 1 inch and at least about 16 inches; and at least embodies herein wherein such at least one depth selector comprises at least one height-adjustable hitch on such at least one towing vehicle; and at least embodies herein wherein such at least one height-adjustable hitch comprises at least one hydraulic hitch; and at least embodies herein at least one depth selector adapted to select the depth of the unprocessed soil that is collected by such at least one unprocessed soil collector.

Although applicant has described applicant's preferred embodiments of this invention, it will be understood that the broadest scope of this invention includes modifications such as diverse shapes, sizes, and materials. Such scope is limited only by the below claims as read in connection with the above specification.

Further, many other advantages of applicant's invention will be apparent to those skilled in the art from the above descriptions and the below claims.

What is claimed is:

1. Apparatus comprising:
a) at least one mobile housing assembly having at least one set of wheels and capable of being towed;
b) at least one separator screen to separate at least one selected soil from at least one unselected soil on the basis of at least one selected particle-size of soil;
c) wherein said at least one separator screen comprises apertures adapted to permit at least one selected particle size of soil to pass through said at least one separator screen;
d) wherein said at least one separator screen is carried by said at least one mobile housing;
e) wherein said at least one separator screen is fixed relative to said at least one mobile housing assembly;
f) at least one unprocessed soil collector adapted to collect at least one unprocessed soil onto said at least one separator screen;
g) at least one soil pusher adapted to push the at least one unprocessed soil over said at least one separator screen;
h) wherein said at least one soil pusher is freely moveable about exactly one axis positioned relatively distally from said at least one unprocessed soil collector;
i) wherein said at least one soil pusher comprises at least one powered pusher to provide powered pushing movement of at least one unprocessed soil over said at least one separator screen;
j) wherein said at least one powered pusher comprises a plurality of paddles structured and arranged to assist pushing at least one unprocessed soil over said at least one separator screen;
k) at least one automatic jamming reducer to automatically adjust the angle of incline of said at least one soil pusher about said axis to reduce jamming between said at least one powered pusher and said at least one separator screen during separation of the at least one unprocessed soil;
l) at least one pin retainer structured and arranged to movably guide motion of said at least one soil pusher relative to said mobile housing assembly;
m) wherein said at least one pin retainer is affixed to said mobile housing assembly; and
n) wherein said at least one soil pusher further comprises at least one aperture-containing support member which receives said at least one pin retainer.

2. The apparatus according to claim 1 wherein said at least one separator screen is fixed at a pre-determined incline.

3. The apparatus according to claim 2 wherein said at least one unprocessed soil collector is characterized by at least one soil penetrating element positioned to penetrate soil at a user-selected depth.

4. The apparatus according to claim 3 further comprising at least one bin positioned to collect at least one unselected soil.

5. The apparatus according to claim 4 wherein said at least one bin comprises at least one unselected soil dump release.

6. The apparatus according to claim 1 wherein said at least one separator screen is removably connectable with said at least one mobile housing assembly.

7. The apparatus according to claim 1 wherein a portion of said at least one powered pusher is positioned so that, in operation, at least one of said plurality of paddles makes contact with the at least one unprocessed soil and assists in pushing soil onto said at least one unprocessed soil collector.

8. A soil separating system relating to employing at least one wheeled soil-separating vehicle to separate at least one unprocessed soil into at least one selected soil and at least one unselected soil, comprising:
a) at least one wheeled soil-separating vehicle, the wheeled soil-separating vehicle having at least one set of wheels and capable of being towed along at least one horse racetrack to condition the at least one horse racetrack to allow a plurality of horses to race along said horse racetrack;
b) wherein said at least one wheeled soil-separating vehicle includes at least one mobile housing assembly structured and arranged to hold at least one separator;
c) wherein said at least one separator is adapted to separate the at least one selected soil from the at least one unselected soil on the basis of at least one selected particle-size of soil;

d) wherein said at least one separator is fixed relative to said at least one mobile housing assembly;
e) at least one unprocessed soil collector adapted to collect the at least one unprocessed soil onto said at least one separator;
f) at least one soil pusher adapted to push the at least one unprocessed soil over said at least one separator, wherein said at least one soil pusher is freely moveable about exactly one axis relatively positioned distally from said at least one unprocessed soil collector;
g) wherein said at least one separator comprises at least one aperture adapted to permit the at least one selected particle-size of soil to pass through said at least one separator;
h) wherein said at least one soil pusher comprises at least one powered pusher to provide powered pushing movement of the at least one unprocessed soil over said at least one separator;
i) wherein said at least one powered pusher comprises a plurality of paddles structured and arranged to assist pushing the at least one unprocessed soil over said at least one separator;
j) at least one automatic jamming reducer to automatically adjust the angle of incline of said at least one soil pusher about said axis to reduce jamming between said at least one powered pusher and said at least one separator during processing of the at least one unprocessed soil;
k) at least one pin retainer structured and arranged to movably guide motion of said at least one soil pusher relative to said mobile housing assembly;
l) wherein said at least one pin retainer is affixed to said mobile housing assembly;
m) wherein said at least one soil pusher further comprises at least one aperture-containing support member which receives said at least one pin retainer;
n) wherein said at least one wheeled soil-separating vehicle is legally equipped to be driven on a public highway in the United States;
o) wherein the weight of said at least one wheeled soil-separating vehicle is about 5,000 pounds or less.

9. The soil separating system, according to claim 8, further comprising at least one holder adapted to hold at least one unselected particle-size of soil.

10. The soil separating system, according to claim 9, wherein the at least one unselected soil is pushed across said at least one separator and into said at least one holder.

11. The soil separating system, according to claim 9, wherein said at least one mobile housing assembly further comprises said at least one holder.

12. The soil separating system, according to claim 11, wherein said at least one holder comprises at least one bin.

13. The soil separating system, according to claim 12, wherein said at least one bin comprises at least one unselected soil dump release.

14. The soil separating system, according to claim 12, wherein said at least one bin has at least one capacity of about four cubic yards of the at least one unselected soil.

15. The soil separating system, according to claim 8, wherein said at least one separator comprises at least one screen adapted to screen sift the at least one unselected soil from the at least one selected soil.

16. The soil separating system, according to claim 15, wherein said at least one screen is removable.

17. The soil separating system, according to claim 16, wherein said at least one screen comprises at least one set of interchangeable screens, each respective one of said interchangeable screens adapted to sift at least one size of the at least one unselected soil from the at least one selected soil.

18. The soil separating system, according to claim 15, wherein said at least one screen is substantially flat.

19. The soil separating system, according to claim 15, wherein said at least one screen is substantially rigid.

20. The soil separating system, according to claim 15, wherein said at least one screen comprises at least one woven metal sheet comprising at least one open area adapted to permit passage of the at least one selected soil.

21. The soil separating system, according to claim 8, wherein said at least one powered pusher comprises at least one conveyor belt.

22. The soil separating system, according to claim 21, wherein said at least one conveyor belt comprises at least one chain.

23. The soil separating system, according to claim 8, wherein said at least one powered pusher comprises at least one hydraulic power system adapted to hydraulically power said at least one powered pusher.

24. The soil separating system, according to claim 23, wherein said at least one hydraulic power system comprises at least one hydraulic pump adapted to be powered by at least one power-take-off drive.

25. The soil separating system, according to claim 23, wherein said at least one hydraulic power system comprises at least one hydraulic motor.

26. The soil separating system, according to claim 8, further comprising at least one depth selector, wherein said at least one depth selector assists in selectively positioning said at least one at least one unprocessed soil collector at a plurality of soil depth selections each less than four inches.

27. The soil separating system, according to claim 8, wherein said at least one wheeled soil-separating vehicle is adapted to be towed by at least one towing vehicle during sifting.

28. The soil separating system, according to claim 27, further comprising at least one towing vehicle.

29. The soil separating system, according to claim 28, further comprising at least one depth selector adapted to select the depth of the at least one unprocessed soil that is collected by said at least one unprocessed soil collector; wherein said at least one depth selector comprises at least one height-adjustable hitch of said at least one towing vehicle.

30. The soil separating system, according to claim 29, wherein said at least one height-adjustable hitch comprises at least one hydraulic hitch.

31. The soil separating system, according to claim 28, wherein said at least one towing vehicle comprises at least one tractor.

32. A soil separating method, relating to cleaning debris from a horse racetrack, comprising the steps of:
a) selecting at least one depth of at least one unprocessed soil on the horse racetrack to collect;
b) selecting at least one particle size;
c) installing at least one separator screen having apertures of such at least one particle size in at least one wheeled soil separator; wherein such at least one wheeled soil separator further comprises
  i) at least one mobile housing assembly having at least one set of wheels and capable of being towed,
  ii) wherein such at least one separator screen is carried by such at least one mobile housing,
  iii) wherein such at least one separator screen is fixed relative to such at least one mobile housing assembly, iv) at least one unprocessed soil collector adapted to collect at least one unprocessed soil onto such at least one separator screen,
v) at least one soil pusher adapted to push the at least one unprocessed soil over such at least one separator screen,
vi) wherein such at least one soil pusher is freely moveable about exactly one axis positioned relatively distally from such at least one unprocessed soil collector,
vii) wherein such at least one soil pusher comprises at least one powered pusher to provide powered pushing movement of at least one unprocessed soil over said at least one separator screen,
viii) wherein such at least one powered pusher comprises a plurality of paddles structured and arranged to assist pushing at least one unprocessed soil over such at least one separator screen,
ix) at least one automatic jamming reducer to automatically adjust the angle of incline of such at least one soil pusher about such axis to reduce jamming between such at least one powered pusher and such at least one separator screen during separation of the at least one unprocessed soil,
x) at least one pin retainer structured and arranged to movably guide motion of such at least one soil pusher relative to such mobile housing assembly,
xi) wherein such at least one pin retainer is affixed to such mobile housing assembly, and
xii) wherein such at least one soil pusher further comprises at least one aperture-containing support member which receives such at least one pin retainer,
d) towing such at least one wheeled soil separator through such depth of at least one unprocessed soil along the horse racetrack;
e) collecting such depth of at least one unprocessed soil onto such at least one separator screen;
f) pushing such at least one unprocessed soil across such at least one separator screen;
g) allowing soil particles smaller than such at least one particle size to fall through such at least one separator screen; and
h) pushing soil particles larger than such at least one particle size across such at least one separator screen and into at least one holder;
i) wherein the at least one unprocessed soil is continuously collected and screened as such at least one wheeled soil separator is towed through such at least one unprocessed soil; and
j) wherein the horse racetrack is cleared of soil particles larger than such at least one particle size.

* * * * *